(12) United States Patent
Li et al.

(10) Patent No.: US 9,059,632 B2
(45) Date of Patent: Jun. 16, 2015

(54) CONTROLLERS FOR DC TO DC CONVERTERS

(75) Inventors: Gang Li, Chengdu (CN); Fengjiang Zhang, Chengdu (CN); Laszlo Lipcsei, Campbell, CA (US)

(73) Assignee: O2Micro, Inc., Santa Clara, CA (US)

( * ) Notice: Subject to any disclaimer, the term of this patent is extended or adjusted under 35 U.S.C. 154(b) by 760 days.

(21) Appl. No.: 12/874,438

(22) Filed: Sep. 2, 2010

(65) Prior Publication Data

US 2010/0327836 A1 Dec. 30, 2010

Related U.S. Application Data

(63) Continuation-in-part of application No. 12/053,943, filed on Mar. 24, 2008, now abandoned.

(51) Int. Cl.
*G05F 1/00* (2006.01)
*H02M 3/158* (2006.01)
*H02M 1/00* (2006.01)

(52) U.S. Cl.
CPC .... *H02M 3/1588* (2013.01); *H02M 2001/0009* (2013.01); *H02M 2001/0032* (2013.01); *Y02B 70/1466* (2013.01); *Y02B 70/16* (2013.01)

(58) Field of Classification Search
USPC .......................................... 323/282–285, 288
See application file for complete search history.

(56) References Cited

U.S. PATENT DOCUMENTS

| | | | |
|---|---|---|---|
| 4,727,308 A | 2/1988 | Huljak et al. | |
| 5,262,780 A | 11/1993 | Gray | |
| 5,430,366 A | 7/1995 | Erckert et al. | |
| 5,566,060 A | 10/1996 | Shimer et al. | |
| 5,818,207 A * | 10/1998 | Hwang | 323/288 |
| 5,905,370 A | 5/1999 | Bryson | |
| 5,949,226 A | 9/1999 | Tanaka et al. | |
| 5,959,441 A | 9/1999 | Brown | |
| 5,982,160 A | 11/1999 | Walters et al. | |
| 6,060,868 A | 5/2000 | Mazzorin | |
| 6,137,240 A | 10/2000 | Bogdan | |
| 6,157,182 A * | 12/2000 | Tanaka et al. | 323/284 |

(Continued)

FOREIGN PATENT DOCUMENTS

| | | |
|---|---|---|
| CN | 2660781 Y | 12/2004 |
| CN | 1201470 C | 5/2005 |

(Continued)

OTHER PUBLICATIONS

European Office Action dated Jan. 15, 2009 issued in related European Patent Application No. 03768917.7-1242.

(Continued)

*Primary Examiner* — Adolf Berhane
*Assistant Examiner* — Henry Lee, III

(57) ABSTRACT

A controller includes a ramp signal generator and control circuitry coupled to the ramp signal generator. The ramp signal generator provides a control current through a resistive component to control energy stored in a first energy storage component. The ramp signal generator further generates a ramp signal based on the energy stored in the first energy storage component. The control circuitry adjusts a voltage at one end of the resistive component thereby controlling the control current to indicate a voltage across a second energy storage component. The control circuitry further controls a current through the second energy storage component within a predetermined range based on the ramp signal.

25 Claims, 18 Drawing Sheets

(56) References Cited

U.S. PATENT DOCUMENTS

| | | | |
|---|---|---|---|
| 6,215,288 B1 | 4/2001 | Ramsey et al. | |
| 6,226,193 B1 | 5/2001 | Bayer et al. | |
| 6,246,220 B1 | 6/2001 | Isham et al. | |
| 6,288,524 B1 | 9/2001 | Tsujimoto | |
| 6,300,777 B1 | 10/2001 | Ribarich | |
| 6,313,616 B1 | 11/2001 | Deller et al. | |
| 6,326,774 B1 | 12/2001 | Mueller et al. | |
| RE37,609 E | 3/2002 | Bittner | |
| 6,366,070 B1 | 4/2002 | Cooke et al. | |
| 6,377,032 B1 | 4/2002 | Andruzzi et al. | |
| 6,396,250 B1 | 5/2002 | Bridge | |
| 6,396,252 B1 | 5/2002 | Culpepper et al. | |
| 6,531,853 B2 | 3/2003 | Umemoto | |
| 6,541,947 B1 | 4/2003 | Dittmer et al. | |
| 6,642,697 B2 | 11/2003 | Zuniga et al. | |
| 6,791,306 B2 | 9/2004 | Walters et al. | |
| 6,900,624 B2 | 5/2005 | Abo | |
| 7,017,087 B2 | 3/2006 | Panis et al. | |
| 7,075,275 B2 | 7/2006 | Motomori et al. | |
| 7,203,460 B2 | 4/2007 | Boose et al. | |
| 7,409,484 B2 | 8/2008 | Morrow | |
| 7,444,558 B2 | 10/2008 | Mitbander et al. | |
| 7,498,793 B2* | 3/2009 | Xu | 323/288 |
| 7,613,393 B2 | 11/2009 | Aronson et al. | |
| 7,646,179 B2 | 1/2010 | Hagino | |
| 8,358,114 B1* | 1/2013 | Ferris et al. | 323/282 |
| 2005/0017703 A1* | 1/2005 | Walters et al. | 323/288 |
| 2007/0170902 A1* | 7/2007 | Chen et al. | 323/282 |
| 2008/0042633 A1* | 2/2008 | Klein | 323/288 |
| 2010/0134080 A1* | 6/2010 | Ouyang | 323/282 |

FOREIGN PATENT DOCUMENTS

| | | |
|---|---|---|
| CN | 1761135 A | 4/2006 |
| CN | 1780125 A | 5/2006 |
| EP | 0765021 A1 | 3/1997 |
| EP | 0967713 A2 | 12/1999 |
| EP | 0726160 B1 | 12/2002 |
| JP | 61177161 A | 8/1986 |
| JP | 08289535 A | 11/1996 |
| JP | 08294269 A | 11/1996 |
| JP | 08340670 A | 12/1996 |
| JP | 10215567 A | 8/1998 |
| JP | 11299224 A | 10/1999 |
| JP | 2000066628 A | 3/2000 |
| JP | 2000287439 A | 10/2000 |
| JP | 2002223562 A | 8/2002 |
| JP | 2002252979 A | 9/2002 |
| JP | 2002281744 A | 9/2002 |
| JP | 2002315313 A | 10/2002 |
| TW | 469684 B | 12/2001 |
| WO | 2008011326 A1 | 1/2008 |

OTHER PUBLICATIONS

Supplemental European Search Report for European Patent Application No. 03768917.7-1242, dated Jul. 31, 2008.

International Search Report and Written Opinion of the International Search Authority; Mailed Nov. 27, 2007; PCT/US2007/073346, 10 pages.

Japanese Notice of Reasons for Rejection dated Aug. 26, 2008 issued in related Japanese Patent Application No. 2005-507156 (with English Language translation).

Japanese Notice Reasons for Rejection issued in related Japanese Patent Application No. 2005507156, dated Aug. 14, 2007.

Japanese Notice Reasons for Rejection issued in related Japanese Patent Application No. 2005-507156, dated Mar. 11, 2008.

English translation of Chinese Office Action issued in related Chinese Application No. 200310114308.0, dated Apr. 7, 2006 (3 pgs).

English translation of Chinese Office Action issued in related Chinese Application No. 2006100578182 dated Jan. 25, 2008 (5 pages).

English translation of Chinese Office Action dated Jun. 29, 2007 issued in related Chinese Application No. 2003801031609.

Barry Arbetter, et al., "DC-DC Converter Design for Battery-Operated Systems", IEEE, 1995, pp. 103-109, XP010150545.

English Translation for First Office Action of Chinese Patent Application No. 200810179360.7 dated Dec. 31, 2010.

Richard Redl and Jian Sun, "Ripple-Based Control of Switching Regulators—An Overview", IEEE Transactions on Power Electronics, vol. 24, No. 12, Dec. 2009, pp. 2669-2680.

* cited by examiner

| HDR_EN = 1 | SWITCH | STATUS | STATE |
|---|---|---|---|
| PWM = 1 | 1010 | OFF | TON_BOOST SATE |
|  | 1012 | ON |  |
| PWM = 0 | 1010 | ON | TOFF_BOOST SATE |
|  | 1012 | OFF |  |

| HDR_EN = 0 | SWITCH | STATUS | STATE |
|---|---|---|---|
| PWM = 1 | 1010 | OFF | TON_BOOST SATE |
|  | 1012 | ON |  |
| PWM = 0 | 1010 | OFF | SKIP SATE |
|  | 1012 | OFF |  |

CONTROLLERS FOR DC TO DC CONVERTERS

RELATED APPLICATION

The present application is a continuation-in-part of U.S. patent application Ser. No. 12/053,943, filed Mar. 24, 2008, which itself is a continuation-in-part of U.S. patent application Ser. No. 11/468,146, filed Aug. 29, 2006, which itself is a continuation of U.S. patent application Ser. No. 11/037,598, filed Jan. 18, 2005 (now U.S. Pat. No. 7,098,642 issued on Aug. 29, 2006), which itself is a continuation of U.S. patent application Ser. No. 10/668,459, filed Sep. 23, 2003 (now U.S. Pat. No. 6,844,710, issued Jan. 18, 2005), which itself is continuation-in-part of U.S. patent application Ser. No. 10/389,037, filed Mar. 14, 2003 (now U.S. Pat. No. 6,965,221 issued on Nov. 15, 2005), all of which claim the benefit of U.S. Provisional Application Ser. No. 60/425,553, filed Nov. 12, 2002 and all of which are fully incorporated herein by reference.

BACKGROUND

A (direct-current to direct-current) DC to DC converter can include a controller to generate a pulse-width modulation (PWM) signal to drive a switching circuit, so as to control an output voltage of the DC to DC converter. For example, the controller can increase the output voltage by increasing the duty cycle of the PWM signal, or decrease the output voltage by decreasing the duty cycle of the PWM signal.

A conventional controller 150 for the DC to DC converter is illustrated in FIG. 1A. The controller 150 includes an oscillator 152, a comparator 154, an operational transconductance amplifier (OTA) 156, and a capacitor 158. The oscillator 152 provides an oscillating voltage 160 to a non-inverting input terminal of the comparator 154. A reference voltage 162 on the capacitor 158 is provided to an inverting input terminal of the comparator 154. The comparator 154 compares the oscillating voltage 160 with the reference voltage 162 and outputs a PWM signal 168 according to the comparison. The reference voltage 162 is within a range between a maximum level and a minimum level of the oscillating voltage 160. If the reference voltage 162 increases, the duty cycle of the PWM signal 168 decreases, and thus the output voltage of the DC to DC converter decreases. If the reference voltage 162 decreases, the duty cycle of the PWM signal 168 increases, and thus the output voltage increases.

The OTA 156 receives a predetermined voltage 166 and a feedback voltage 164 indicative of the output voltage of the DC to DC converter, and provides a control current $I_{COMP}$ proportional to the difference between the predetermined voltage 166 and the feedback voltage 164. The output terminal of the OTA 156 is coupled to the capacitor 158, such that the control current $I_{COMP}$ can control the reference voltage 162 on the capacitor 158. For example, if the feedback voltage 164 is greater than the predetermined voltage 166, the OTA 156 can output the control current $I_{COMP}$ to charge the capacitor 158 in order to increase the reference voltage 162. Thus, the output voltage decreases. If the feedback voltage 164 is less than the predetermined voltage 166, the OTA 156 can absorb the control current $I_{COMP}$ from the capacitor 158 in order to reduce the reference voltage 162. Thus, the output voltage can increase. As a result, the output voltage of the DC to DC converter can be adjusted to a desired level determined by the predetermined voltage 166.

However, in the conventional controller 150, the power consumption of the oscillator 152 can be relatively high. In addition, the capacitor 158 may not be integrated together with the comparator 154 and the OTA 156 into a single chip because of the large size of the capacitor 158. Furthermore, the bandwidth of the OTA 156 may be too narrow that the response time of the OTA 156 is delayed. Therefore, the controller 150 may not control the output voltage accurately.

SUMMARY

In one embodiment, a controller includes a ramp signal generator and control circuitry coupled to the ramp signal generator. The ramp signal generator can provide a control current through a resistive component to control energy stored in a first energy storage component. The ramp signal generator can further generate a ramp signal based on the energy stored in the first energy storage component. The control circuitry can adjust a voltage at one end of the resistive component thereby controlling the control current to indicate a voltage across a second energy storage component. The control circuitry can further control a current through the second energy storage component within a predetermined range based on the ramp signal.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

FIG. 11 includes a table illustrating examples of states of a high-side switch and a low-side switch in response to two control signals, in accordance with one embodiment of the present invention.

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments of the present invention provide DC to DC converters, e.g., buck converters, boost converters, etc., and controllers for controlling the DC to DC converters. Advantageously, an output current of the DC to DC converter can have a constant ripple magnitude such that the output current and output voltage of the DC to DC converter can be relatively stable. The controller can control the output of the DC to DC converter more accurately. In addition, the oscillator 152 with relatively high power consumption, the capacitor 158 with relatively large size, and the OTA 156 with a relatively narrow bandwidth can be omitted.

Figure 1:
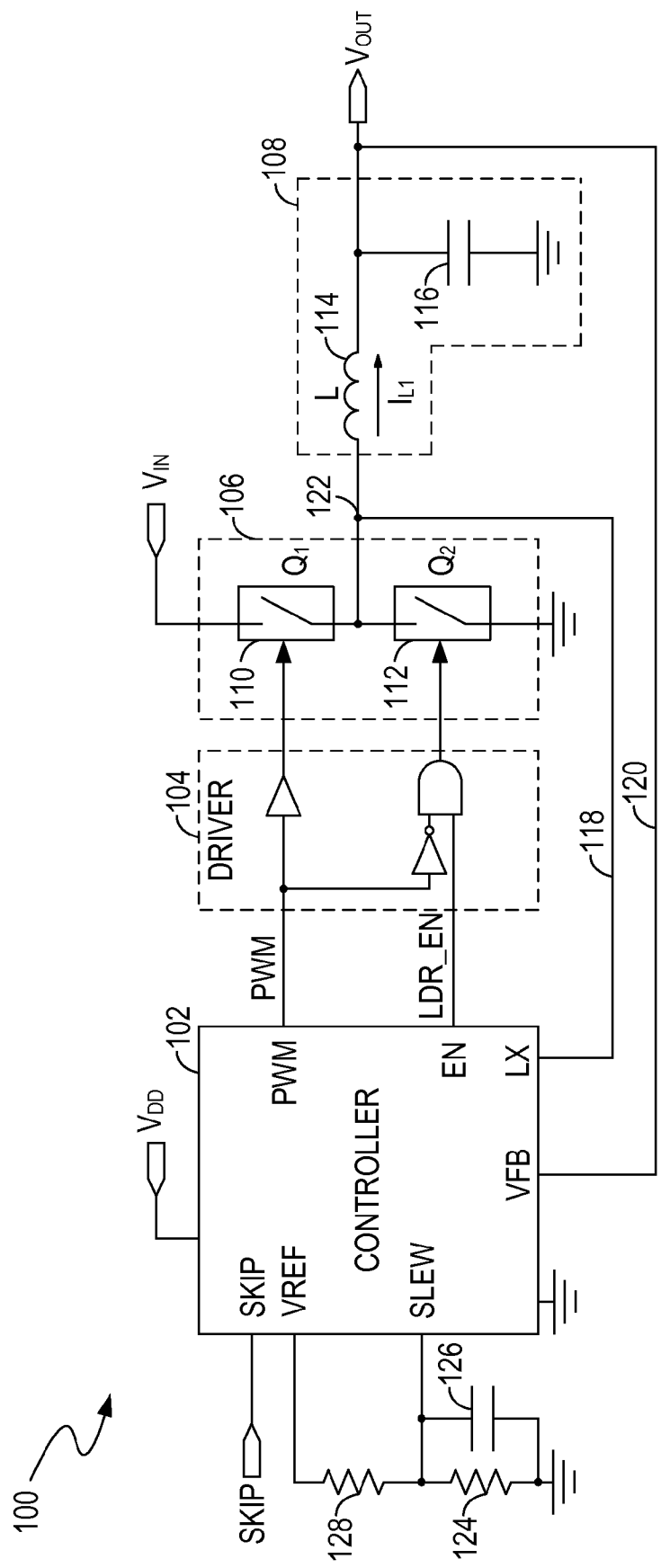
FIG. 1 illustrates a block diagram of an example of a DC to DC converter that includes a feedback path for providing switch state to a controller, in accordance with one embodiment of the present invention.

Referring to FIG. 1, an example of a DC to DC converter 100 is shown that may include controller circuitry 102, driver circuitry 104, switching circuitry 106 and energy storage circuitry (or output circuitry, or a low pass filter) 108. In general, the controller circuitry 102 may generate one or more control signals that may be provided to the driver circuitry 104. For example, the controller circuitry 102 may produce a pulse-width modulation (PWM) signal to control the switching circuitry 106. A pair of switches may be included in the switching circuitry 106. In particular, a high-side switch $Q_1$ 110 and a low-side switch $Q_2$ 112 may respectively receive control signals from the driver circuitry 104 and provide a signal to the energy storage circuitry 108 for producing an output voltage $V_{OUT}$. In general, the driver circuitry 104 may control the switches 110 and 112 such that each of the switches 110 and 112 may be alternatively placed in an "ON" and "OFF" position. In particular, one or more PWM signals provided by the controller circuitry 102 may control the states of the high-side and low-side switches 110 and 112 by varying the duty cycle of the PWM signal.

In this embodiment, if the PWM signal is logic high, the high-side switch 110 is placed in the ON position and the low-side switch 112 is placed in the OFF position. This situation is referred to as a "switch ON" state or a "TON_BUCK" state. In such a situation, an inductor 114 included in the output circuitry 108 may be connected to an input voltage labeled $V_{IN}$ by way of the high-side switch 110. Accordingly, the current flowing through inductor 114 may increase and charge may be stored in a capacitor 116 also included in output circuitry 108. In the example of FIG. 1, the DC to DC converter 100 can be a buck converter. Thus, the input voltage $V_{IN}$ may be larger than the output voltage $V_{OUT}$ and a positive voltage may be present across the inductor 114. An inductor current $I_{L1}$ through the inductor 114 can increase, and magnetic field energy can be stored in the inductor 114. If the PWM signal is logic low, the high-side switch 110 may be in the OFF position and the low-side switch 112 may be in the ON position. This state of the switches 110 and 112 may be referred to as a "switch OFF" state or a "TOFF_BUCK" state. In this situation, a negative voltage may be present across the inductor 114. Accordingly, the magnetic field energy stored by the inductor 114 may collapse and may provide the output voltage $V_{OUT}$ across the capacitor 116. Thus, the output voltage $V_{OUT}$ may be provided based on the duty cycle of the PWM signal provided by the controller circuitry 102. The controller circuitry 102 may also provide an enable signal, e.g., a low-side-switch enable (LDR_EN) signal, to the driver circuitry 104. In this arrangement, the LDR_EN signal is provided from a port labeled "EN" and may also control the state of the high-side switch 110 and the low-side switch 112.

In this embodiment, to produce the PWM signal and the LDR_EN signal, two voltage feedback signals may be provided to the controller circuitry 102. In particular, the output voltage ($V_{OUT}$) may be provided over a path 120 into a port labeled "VFB". Additionally, the voltage present on one side of the inductor 114 may be provided over another path 118 to control the circuitry 102 via a port labeled "LX". The feedback signal provided by the path 118 may be used to determine the state of the high-side switch 110 and the low-side switch 112. Components may be used for setting parameters associated with the controller circuitry 102. For example, a resistor 128 and a resistor 124 along with a capacitor 126 may be connected to the controller circuitry 102 for setting parameters such as a reference voltage and a reference current and/or a reference voltage slew rate.

Figure 2:
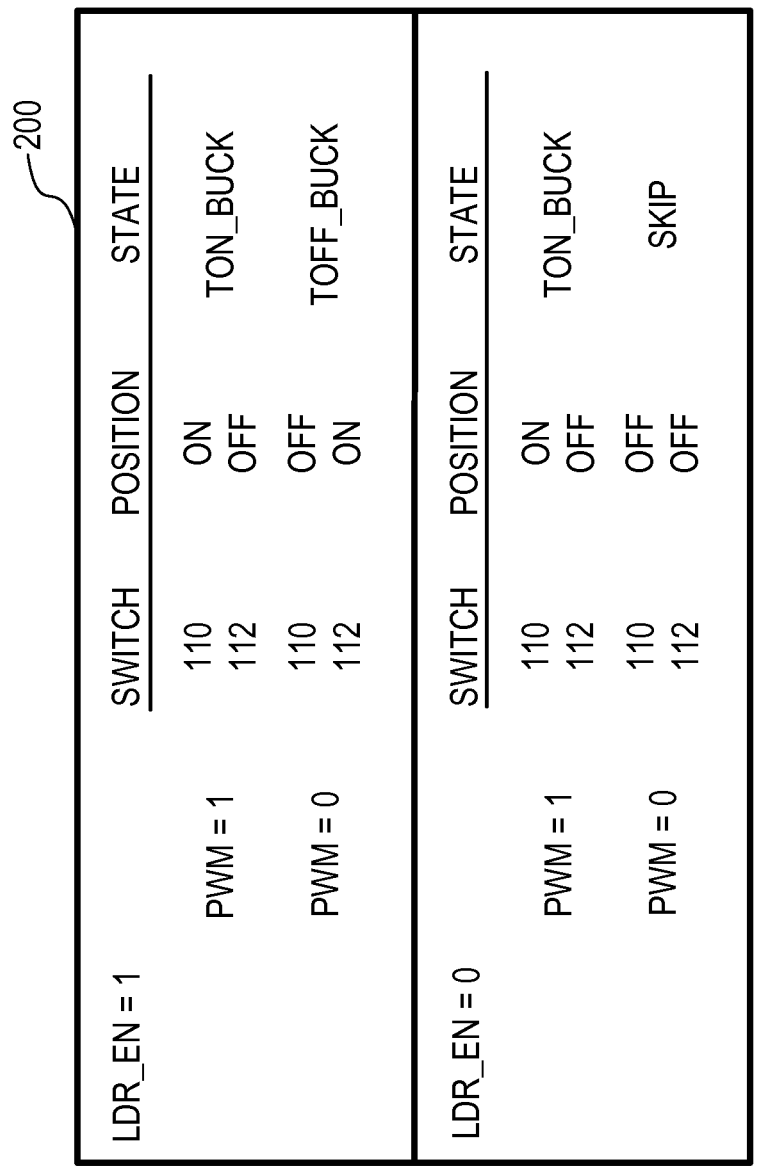
FIG. 2 includes a table illustrating examples of the states of the switches shown in FIG. 1 in response to two control signals.

FIG. 2 includes a table 200 that illustrates the possible positions of switches 110 and 112 depending upon the logic level of the LDR_EN signal and the PWM signal provided by the controller circuitry 102. Additionally, a state may be defined by the positions of the switches 110 and 112. For example, if the switch 110 is on and the switch 112 is off (e.g., LDR_EN signal=1 and PWM signal=1), a "TON_BUCK" state (or a "switch ON" state) is defined. In the TON_BUCK state, the inductor 114 is connected to the input voltage $V_{IN}$. If the switch 110 is off and the switch 112 is on (e.g., LDR_EN signal=1 and PWM signal=0), a "TOFF_BUCK" state (or a "switch OFF" state) is defined. In the TOFF_BUCK state, the inductor 114 is connected to the ground potential. A "SKIP" state is defined when both of the switches 110 and 112 are off (e.g., LDR_EN signal=0 and PWM signal=0). Since both of the switches 110 and 112 are off during the SKIP state, the inductor 114 is floating (i.e., not connected to the source voltage or ground). Thus, the inductor 114 may be connected to the input voltage $V_{IN}$ in the TON_BUCK state, connected to a ground potential in the TOFF_BUCK state, or floating during the SKIP state.

In the TON_BUCK state, the voltage across the inductor 114 may be substantially equivalent to $V_{IN}-V_{OUT}$. For buck conversions, the input voltage $V_{IN}$ may be larger than the output voltage $V_{OUT}$ and a net positive voltage may be across the inductor 114. Due to the net positive voltage, an inductor current $I_{L1}$ flowing through the inductor 114 ramps up according to:

$$dI_{L1}/dt=(V_{IN}-V_{OUT})/L=\Delta I_{L1}/T_{ON}. \qquad (1)$$

In equation (1), $V_{IN}$ may be the input voltage to DC to DC converter 100, $V_{OUT}$ may be the output voltage of the DC to DC converter 100, $T_{ON}$ may be the time interval duration which the switches 110 and 112 are in the TON_BUCK state, L may be the inductance of the inductor 114, and $\Delta I_{L2}$ may be the change in the inductor current $I_{L1}$ during the TON_BUCK state.

During the TOFF_BUCK state, the voltage across the inductor 114 may be equal to the output voltage $V_{OUT}$. However, the polarity of the voltage across the inductor 114 may reverse, and the inductor current $I_{L1}$ ramps down according to:

$$dI_{L1}/dt = -(V_{OUT})/L = \Delta I_{L1}/T_{OFF}. \quad (2)$$

In equation (2), $T_{OFF}$ can represent the time interval duration that the switches 110 and 112 are in the TOFF_BUCK state, and $\Delta I_{L1}$ may be the change in the inductor current $I_{L1}$ during the TOFF_BUCK state.

Figure 3:
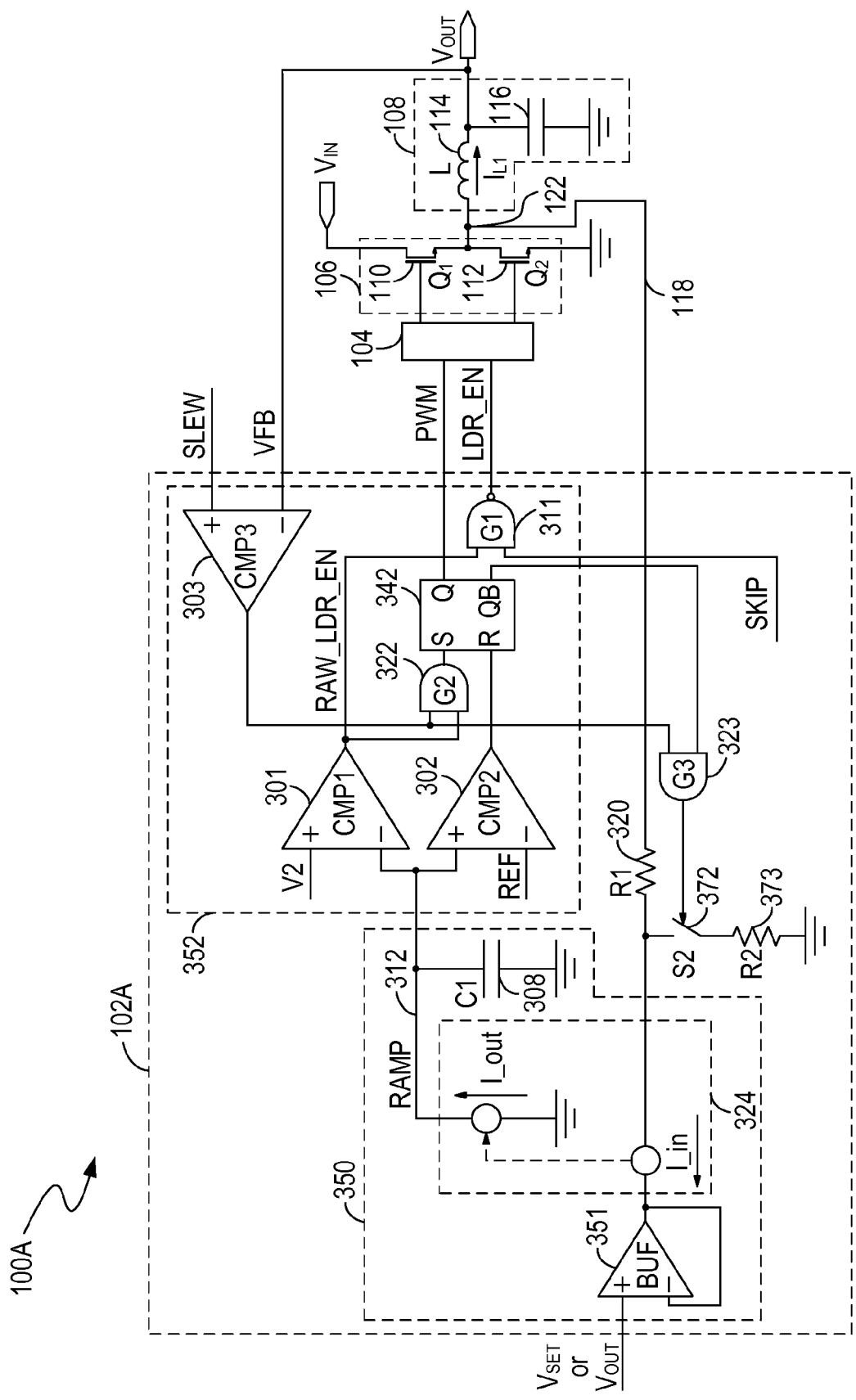
FIG. 3 illustrates a block diagram of an example of the controller shown in FIG. 1.

Turning to FIG. 3, a block diagram of one embodiment of a converter 100A including a controller 102A consistent with the converter 100 of FIG. 1 is illustrated. The controller 102A may be utilized with a variety of DC to DC converters 100A. For example, the DC to DC converter 100A may comprise a synchronous buck converter generally including the controller 102A, a driver circuit 104, a pair of switches 106 including a high-side switch 110 and a low-side switch 112, and a low pass filter 108. The low pass filter 108 may include an inductor 114 and a capacitor 116. The high-side switch 110 may be coupled between an input DC voltage $V_{IN}$ and a switching node LX 122. The low-side switch 112 may be coupled between the switching node LX 122 and ground. The switching node LX 122 may further be coupled to the low pass filter 108.

The controller 102A may comprise pulse-width modulation circuitry 352 configured to generate a pulse-width modulation (PWM) signal and a low-side switch enable (LDR_EN) signal. In response to the PWM and LDR_EN signals, the driver circuit 104 may control the state of the high-side and low-side switches 110 and 112.

The controller 102A may receive an input signal representative of the voltage level at the switching node LX 122. The controller 102A may also have a target input terminal SLEW where the desired output voltage is set (e.g., $V_{SET}$). For example, in the example of FIG. 1, the slew capacitor 126 may be charged based on the value of the resistors 128, 124 in the resistor divider and the value of the reference voltage REF. Those skilled in the art will recognize various ways to charge the slew capacitor 126 and create the target voltage signal. In addition, the terminal VFB of the controller 102A may receive a feedback signal representative of the output voltage $V_{OUT}$ of the DC to DC converter 100A.

The controller 102A as illustrated in FIG. 3 may include a resistor 320 that may be coupled to the switching node LX 122 of the DC to DC converter 100A. A current through the resistor 320 may be responsive to a state of the high-side and low-side switches 110 and 112, e.g., the TON_BUCK state, the TOFF_BUCK state, or the SKIP state. The controller 102A may further include ramp generation circuitry 350 responsive to the current through the resistor 320 to provide a ramp signal 312. The pulse-width modulation circuitry 352 may be configured to generate a PWM signal in response to at least the ramp signal 312.

During the TON_BUCK state when the switch 110 is ON and the switch 112 is OFF, the voltage level of the LX switching node 122 may be equal to $V_{IN}$ since switch 110 is ON and the LX switch node 122 is coupled to $V_{IN}$. Accordingly, the current passing through the resistor 320 may be equal to the input voltage $V_{IN}$ of the DC to DC converter 100A less the output voltage $V_{OUT}$ of the DC to DC converter 100A divided by a resistance value of the resistor 320. In response to this current through the resistor 320, the ramp generation circuitry 350 may generate a portion, e.g., an increasing portion, of the ramp signal 312 as will be discussed more in FIG. 4.

During the TOFF_BUCK state when the switch 110 is OFF and the switch 112 Q2 is ON, the voltage level of the LX switching node 122 may be equal to zero volts since the LX switching node 122 may be coupled to ground via the low-side switch 112. Accordingly, the current passing through the resistor 320 may be equal to zero volts less the output voltage $V_{OUT}$ of the DC to DC converter 100A divided by a resistance value of the resistor 320. In response to this current through the resistor 320, the ramp generation circuitry 350 may generate another portion, e.g., a decreasing portion, of the ramp signal 312 as will be discussed more in FIG. 4.

During the SKIP state (e.g., when the switch 110 is OFF and the switch 112 is OFF), the voltage level of the LX switching node 122 may be equal to the output voltage $V_{OUT}$ of the DC to DC converter 100A. Accordingly, the current passing through the resistor 320 may be equal to zero in the SKIP state since the voltage level at the LX switching node 122 (for example, $V_{OUT}$) less the output voltage $V_{OUT}$ divided by a resistance value of the resistor 320 may be zero. In response to this current through the resistor 320, the ramp generation circuitry 350 may generate another portion, e.g., a substantially constant portion, of the ramp signal 312 as will be discussed more in FIG. 4.

The ramp generation circuitry 350 may include a buffer 351 and a current-controlled current source 324. The buffer 351 may have its inverting input coupled to the output of the buffer 351 to provide negative feedback. The voltage received at the non-inverting input terminal of the buffer 351 may be a voltage representative of the output voltage of the DC to DC converter 100A such as $V_{SET}$ or $V_{OUT}$. The output voltage of the buffer 351 may therefore closely follow the input voltage $V_{SET}$ or $V_{OUT}$ input to the non-inverting input. The current-controlled current source 324 may be responsive to the input current I_in through the resistor 320 as that the input current I_in varies depending on the state of switches 110 and 112. The current-controlled current source 324 may provide an output current I_out that mirrors the input current I_in. In one embodiment, the current-controlled current source 324 includes, but is not limited to, a current mirror. The output current I_out may enable charging and discharging of the ramp capacitor 308 in order to provide the ramp signal 312 to the first and second comparators 301 and 302 of the pulse-width modulation circuitry 352.

The first comparator 301 may compare the ramp signal 312 with a nominal voltage value V2. In one embodiment, the nominal voltage value V2 may be 20 millivolts. The first comparator 301 may provide an output signal RAW_LDR_EN that may be received by the NAND gate 311. The NAND gate 311 may also receive a SKIP signal and provide an output LDR_EN signal to the driver circuitry 104. The second comparator 302 may compare the ramp signal 312 with a reference voltage REF and provide an output signal to the reset terminal R of the flip flop 342. The "Q" output of the flip flop 342 may provide a PWM signal to the driver 104.

The duty cycle of the PWM signal may be inversely proportional to the difference between the input voltage and the output voltage or the target voltage. In other words, as this difference increases, the duty cycle of the PWM signal may decrease thereby decreasing a TON_BUCK time of the switches 110 and 112. Conversely, as the difference between decreases, the duty cycle of the PWM signal may increase thereby decreasing a TOFF_BUCK time of the switches 110 and 112. In one embodiment, the TON_BUCK time, e.g., $T_{ON}$, of the switches 110 and 112 can be inversely proportional to the difference between the voltages $V_{IN}$ and $V_{OUT}$, e.g., $V_{IN}-V_{OUT}$, or the difference between the voltages $V_{IN}$ and $V_{SET}$, e.g., $V_{IN}-V_{SET}$. As such, the current change $\Delta I_{L1}$ of the inductor current $I_{L1}$ can be constant during each TON_BUCK state. In addition, the TOFF_BUCK time, e.g., $T_{OFF}$, of the switches 110 and 112 can be inversely proportional to the voltage $V_{OUT}$ or the voltage $V_{SET}$. As such, the current change $\Delta I_{L1}$ during each TOFF_BUCK state can be constant. In one embodiment, the current change $\Delta I_{L1}$ during each TON_BUCK state and the current change $\Delta I_{L1}$ during each TOFF_BUCK state can be the same. In other words, the controller 102A can be a CRC (constant-ripple-current) controller to control the inductor current $I_{L1}$ to have a constant ripple magnitude.

Figure 4:
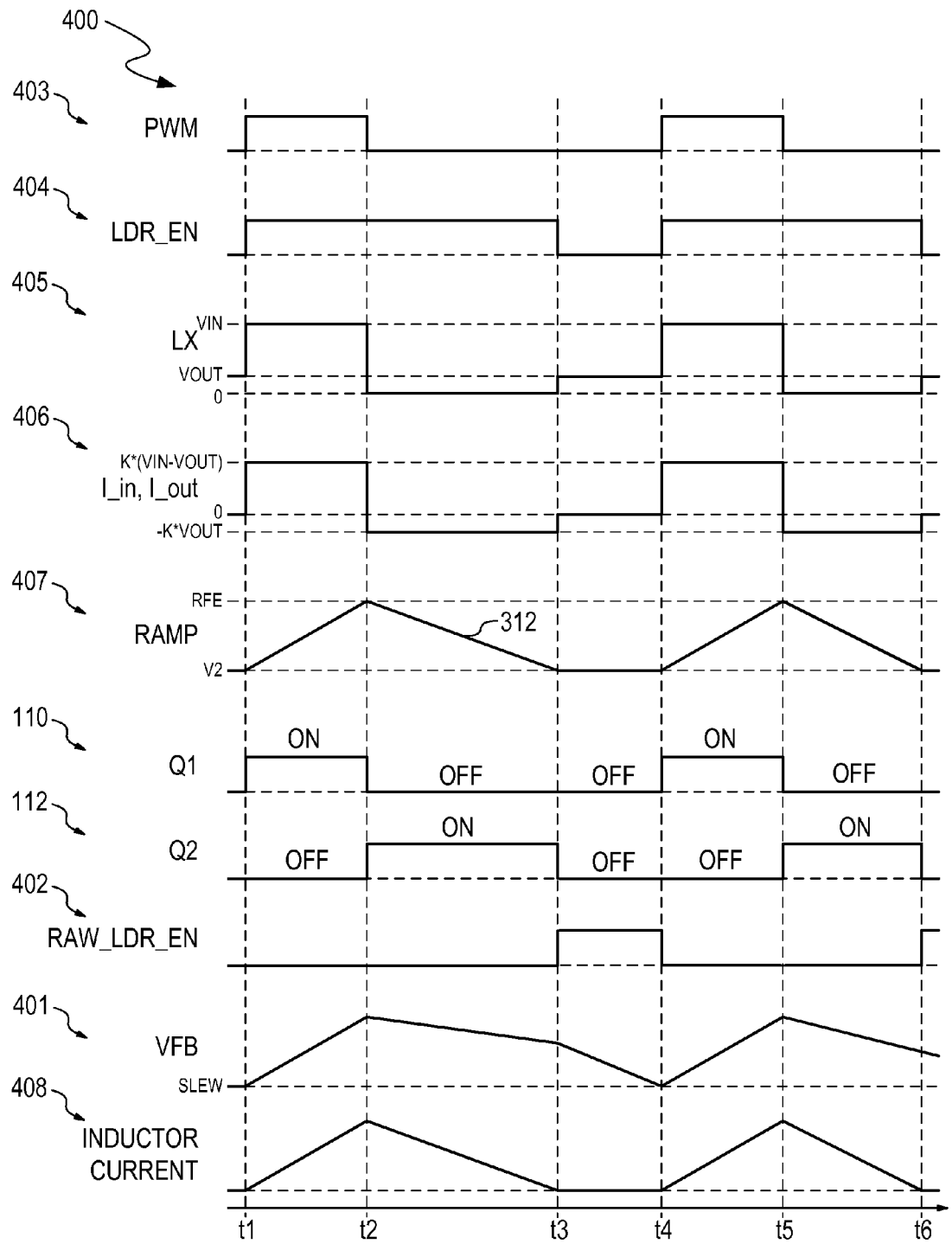
FIG. 4 illustrates a timing diagram of examples of signals associated with the controller shown in FIG. 3.

Turning to FIG. 4 in conjunction with FIG. 3 and FIG. 1, a timing diagram 400 to further illustrate operation of the controller 102A of FIG. 3 including generation of the ramp signal 312 is illustrated. When the controller 102A is enabled, the SLEW voltage (at the SLEW terminal shown in FIG. 1 and FIG. 3) may start to increase. At the moment, the feedback voltage VFB representative of the output voltage $V_{OUT}$ may be zero volts. The comparator 302 of FIG. 3 may then sense that the SLEW voltage is greater than the feedback voltage VFB and may provide a digital one signal to the AND gate 322. The output of the first comparator 301 (e.g., the RAW_LDR_EN signal) may also be a digital one at this time. Accordingly, all inputs to the AND gate 322 may be digital one and the output of the AND gate 322 may then set the flip flop 342. At that moment, the PWM signal may go to a digital one. The high-side switch 110 can be turned on, therefore the output voltage $V_{OUT}$ and the feedback voltage VFB start to increase. In one embodiment, when the SLEW voltage increases to a preset level, e.g., the level of the target voltage $V_{SET}$, the SLEW voltage can remain constant.

During the time interval between times t1 and t2, the PWM signal shown in plot 403 may be a digital one and the LDR_EN signal shown in plot 404 may also be a digital one. Hence the high-side switch 110 and the low-side switch 112 are in the TON_BUCK state with the switch 110 ON and the switch 112 OFF. Accordingly, as shown in plot 405, the voltage level at the LX switching node 122 may be equal to $V_{IN}$ between times t1 and t2 since the LX switching node 122 may be tied to the input voltage $V_{IN}$ of the DC to DC converter 100A during this time interval.

The current I_in through the resistor 320 during this t1 to t2 time interval may be provided by equation (3):

$$I\_in=(V_{IN}-V_{OUT})/R1; \quad (3)$$

where $V_{IN}$ may be the input voltage of the DC to DC converter 100A, $V_{OUT}$ may be the output voltage of the DC to DC converter 100A, and R1 is the resistance of the resistor 320 of FIG. 3. If K=1/R1, then equation (3) may be rewritten as detailed in equation (4):

$$I\_in=K*(V_{IN}-V_{OUT}). \quad (4)$$

Since I_out mirrors I_in, I_out may also be equal to I_in as detailed in equations (3) and (4) and as illustrated by plot 406. During the time interval between times t1 and t2, the ramp signal 312 may ramp up in proportion to the I_out signal as shown by plot 407. The ramp signal 312 may ramp up until it reaches the reference voltage REF input to the inverting input terminal of the second comparator 302. When the ramp signal 312 reaches the REF level at time t2, the output of the second comparator 302 may reset the flip flop 342.

When the flip flop 342 is reset at time t2, the Q output of the flip flop 342 may become a digital zero and hence the PWM signal shown in plot 403 may be a digital zero. The RAW_LDR_EN signal (shown in plot 402) from the first comparator 301 may be a digital zero so the output of the NAND gate 311 (e.g., the LDR_EN signal shown in plot 404) may be a digital one. Accordingly, the switches 110 and 112 may be in the TOFF_BUCK state between time intervals t2 and t3 with the high-side switch 110 OFF and the low-side switch 112 ON. When switches 110 and 112 are in this TOFF_BUCK state, the voltage level at the LX switching node 122 may be equal to zero volts as detailed by plot 405 since the LX switching node 122 may be coupled to ground via the low-side switch 112.

The current I_in in plot 406 through the resistor 320 during the time interval between times t2 and t3 may be given by equation (5):

$$I\_in=(0-V_{OUT})/R1. \quad (5)$$

If K=1/R1, then equation (5) may be rewritten as detailed in equation (6):

$$I\_in=K*V_{OUT}. \quad (6)$$

Since I_out mirrors I_in, I_out may also be equal to I_in as detailed in equations (5) and (6) and as illustrated by plot 406. During the time interval between times t2 and t3, the ramp signal 312 may ramp down in proportion to the I_out signal as shown in plot 406. The ramp signal 312 may ramp down until it reaches the voltage level V2 input to the non-inverting input terminal of the first comparator 301. At time t3 when the ramp signal 312 reaches voltage level V2, the output of the first comparator 301 (e.g., RAW_LDR_EN) may go to a digital one. When the ramp signal 312 reaches the V2 voltage level at time t3, the inductor current $I_{L1}$ as represented by plot 408 in FIG. 4 may be at a zero crossing. As such, the controller 102A may provide a zero crossing estimator of the inductor current $I_{L1}$ through the inductor 114 without directly measuring such current.

If the SKIP signal is also a digital one at time t3 (e.g., so that the SKIP state is enabled), the output, e.g., the LDR_EN signal in plot 404, of the NAND gate 311 may be a digital zero. Accordingly, between times t3 and t4 the controller 102A may be in the SKIP state. In response to the digital zero PWM signal shown in plot 403 and the digital zero LDR_EN signal shown in plot 404, both switches 110 and 112 may be off in the SKIP state. In one embodiment, the SKIP state may occur if the feedback voltage VFB is greater than the SLEW voltage when the ramp signal 312 reaches the V2 voltage level. However, if the feedback voltage VFB is less than or equal to the SLEW voltage when the ramp signal 312 reaches the V2 voltage level, the AND gate 322 can set the flip flop 342 to output a digital-one PWM signal. In other words, if the feedback voltage VFB is less than or equal to the SLEW voltage when the ramp signal 312 reaches the V2 voltage level, TON_BUCK state occurs and there is no SKIP state.

Accordingly, the voltage (shown in plot 405) at the LX switching node 122 as illustrated may be equal to the output voltage $V_{OUT}$ of the DC to DC converter 100A during the SKIP state when switches 110 and 112 are OFF. In addition, the current I_in passing through the resistor 320 and the current I_out in plot 406 may be equal to zero in the SKIP state since the voltage level at the LX switching node 122 less the output voltage $V_{OUT}$ divided by a resistance value of the resistor 320 is zero.

When the SKIP state is enabled, the controller 102A may keep the switches 110 and 112 in the SKIP state until the output voltage $V_{OUT}$ of the DC to DC converter 100A as represented by VFB falls below a set voltage level (e.g., the SLEW voltage).

During the t1 to t2 time interval, the feedback voltage VFB may increase at a positive slope when the switch 110 is ON and the switch 112 is OFF. During the t2 to t3 time interval, when the switch 110 is OFF and the switch 112 is ON, the feedback voltage VFB may decay until it reaches SLEW at time t4. During the t3 to t4 time interval, the switches 110 and 112 are off. The feedback voltage VFB may decrease faster than during the t2 to t3 time interval. At time t4, the output of the third comparator 303 may go to a digital one. The digital one from the third comparator 303 and from the first comparator 301 may cause the output of the AND gate 322 to go to a digital one to set the flip flop 342 and hence cause the PWM signal in plot 403 to go to a digital one. The process may then repeat itself as illustrated in the timing diagram 400 for times t4 to t6. The rate of decay of the feedback voltage VFB shown in plot 401 during the t3 to t4 time interval may depend on the load current. For example, the rate of decay may be slower for a light load current than for a comparatively larger load current. Therefore, the controller 102A may maintain the SKIP state for a longer time for a light load current than for the comparatively larger load current.

Turning back to FIG. 3, a switch 372 may be turned on to affect the slope of the ramp signal 312 during certain time intervals, e.g., during time the t2 to t3 time interval or the t5 to t6 time interval, to shorten the duration of the TOFF_BUCK state. The switch 372 may be controlled by the output of the AND gate 323 and the switch 372 may be turned on when both inputs to the AND gate 323 are digital one. This may occur when the VFB voltage is less than the SLEW voltage so that the output of the third comparator 303 is a digital one and the "QB" terminal output of the flip flop 342 is a digital one. In other words, if the VFB voltage decreases to the SLEW voltage before the ramp signal 312 decreases to the voltage level V2, the switch 372 can be turned on. When the switch 372 is on, the duration of the TOFF_BUCK state may be shortened compared to its duration if the switch 372 was off. This may occur since the negative slope of the ramp signal 312 during the TOFF_BUCK state, e.g., during the t2 to t3 time interval, may be further decreased compared to its slope if the switch 372 was turned off. More specifically, during the TOFF_BUCK state, if the switch 372 is on, the current I_in that flows from the output terminal of the buffer 351 can increase since an extra current can flow through a resistor 373 to ground. Thus, the discharging current I_out increases, and the time for the ramp signal 312 to decrease from the voltage level REF to the voltage level V2 also decreases. In other words, the duration of the TOFF_BUCK state can be shortened. The rate of the accelerated TOFF_BUCK state may be selected by the choice of the resistor 373. The controller 102A may also not include the switch 372, the resistor 373, and the AND gate 323 if this accelerated TOFF_BUCK time feature is not desired.

According to the example of FIG. 3, during a TON_BUCK state, the flowing equation can be obtained:

$$dV_{312}/dt = I\_out/C1 = \Delta V_{312}/T_{ON}, \quad (7a)$$

where $V_{312}$ represents a voltage level of the ramp signal 312, C1 represents the capacitance of the ramp capacitor 308, and $\Delta V_{312}$ represents the change in the voltage level $V_{312}$ during the TON_BUCK state. Since the current I_in can be equal to the current I_out, equation (7a) is rewritten as:

$$I\_in/C1 = \Delta V_{312}/T_{ON}. \quad (7b)$$

Based on equations (1), (4) and (7b), the flowing equation is obtained:

$$\Delta I_{L1} = (\Delta V_{312} * C1)/(K*L). \quad (8)$$

During each TON_BUCK state, the voltage change $\Delta V_{312}$ in equation (8) can be constant, e.g., equal to the voltage level REF minus the voltage level V2. Therefore, the current change $\Delta I_{L1}$ can also be constant. Similarly, during a TOFF_BUCK state, the flowing equation can be obtained:

$$dV_{312}/dt = I\_out/C1 = \Delta V_{312}/T_{OFF}, \quad (9a)$$

where $\Delta V_{312}$ represents the change in the voltage level $V_{312}$ during the TOFF_BUCK state. Equation (9a) is rewritten as:

$$I\_in/C1 = \Delta V_{312}/T_{OFF}. \quad (9b)$$

Based on equations (2), (6) and (9b), the flowing equation is obtained:

$$\Delta I_{L1} = (\Delta V_{312} * C1)/(K*L). \quad (10)$$

During each TOFF_BUCK state, the voltage change $\Delta V_{312}$ in equation (10) can be constant, e.g., equal to the voltage level V2 minus the voltage level REF. Therefore, the current change $\Delta I_{L1}$ can also be constant. Since the amount of the voltage change $\Delta V_{312}$ during each of the TON_BUCK and TOFF_BUCK states can be the same, the amount of the current change $\Delta I_{L1}$ during each of the TON_BUCK and TOFF_BUCK states can be the same. In other words, the controller 102A can be a CRC controller that controls the inductor current $I_{L1}$ to have a constant ripple magnitude.

In one embodiment, by using the comparator 303, the AND gate 322, the AND gate 323, the flip flop 342, the switch 372, and the resistor 373, the controller 102A can adjust an average voltage $V_{AVE}$ of the output voltage $V_{OUT}$ to the target voltage $V_{SET}$ at the SLEW terminal. Specifically, during a TOFF_BUCK state, if the feedback voltage VFB is greater than the SLEW voltage when the ramp signal 312 decreases to the voltage level V2, the average voltage $V_{AVE}$ can be greater than the target voltage $V_{SET}$. In such a situation, the comparator 303 can output a digital zero to maintain the PWM signal digital zero, e.g., via the AND gate 322 and the flip flop 342, until the feedback voltage VFB decreases to the SLEW voltage. Therefore, the duration of the TOFF_BUCK state can increase, so as to reduce the duty cycle of the PWM signal. As such, the average voltage $V_{AVE}$ can decrease. If the feedback voltage VFB decreases to the SLEW voltage before the ramp signal 312 decreases to the voltage level V2, the average voltage $V_{AVE}$ can be less than the target voltage $V_{SET}$. In such a situation, the comparator 303 can output a digital one to the AND gate 323, and to turn on the switch 372. The duration of the TOFF_BUCK state therefore can decrease, so as to increase the duty cycle of the PWM signal. As such, the average voltage $V_{AVE}$ can increase. As a result, the average voltage $V_{AVE}$ is adjusted to the target voltage $V_{SET}$.

Figure 5:
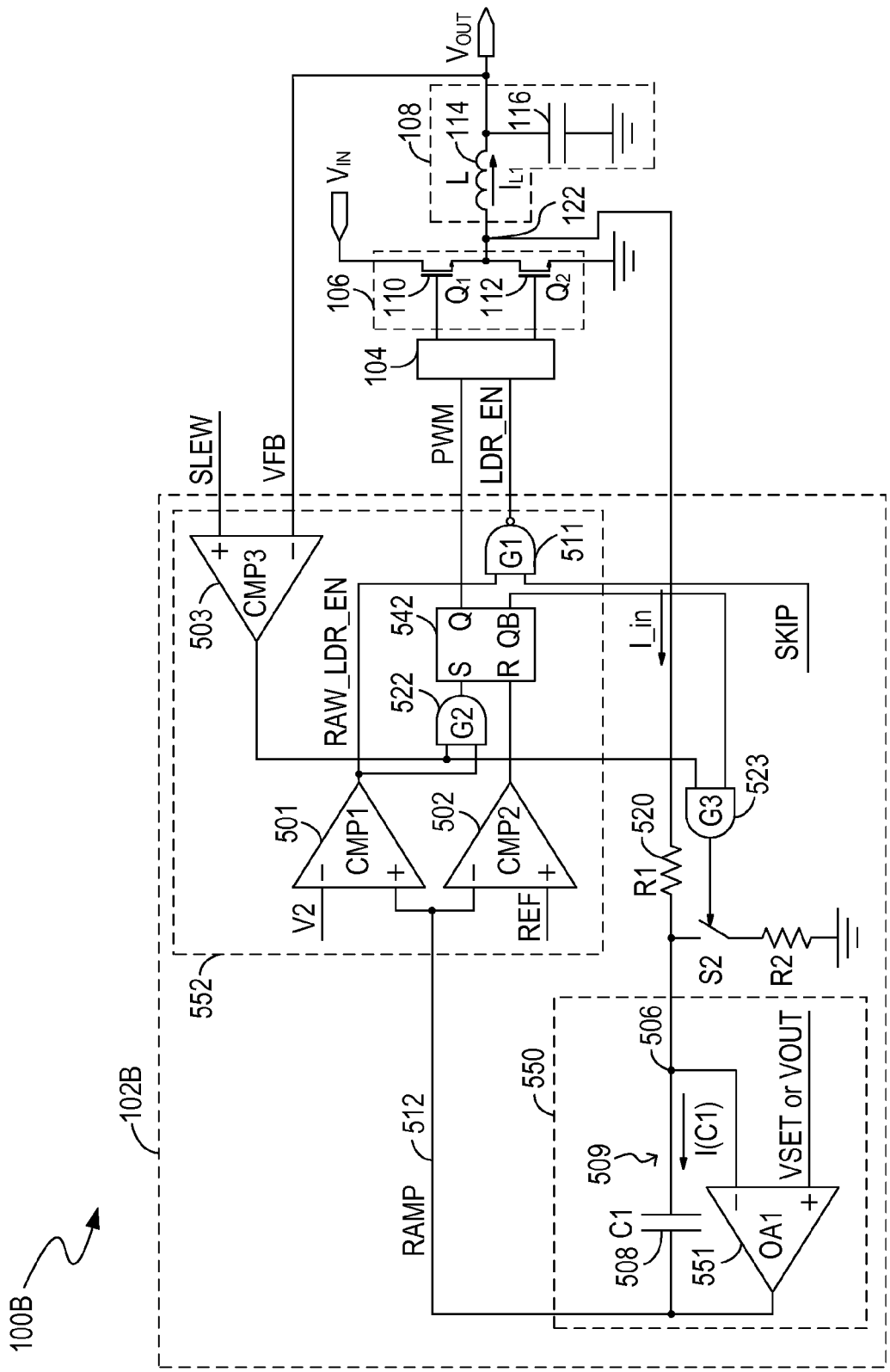
FIG. 5 illustrates a block diagram of an example of the controller shown in FIG. 1.

FIG. 5 shows another embodiment of a controller 102B consistent with FIG. 1. The description of parts in FIG. 5 that may be similar to FIG. 3 is omitted herein for clarity. The controller 102B may include a resistor 520 coupled to the switching node 122 of the DC to DC converter 100B. The controller 102B may include ramp generation circuitry 550 responsive to the current through the resistor 520 to provide a ramp signal 512. The controller 102B may further include pulse-width modulation circuitry 552 configured to generate a PWM signal in response to at least the ramp signal 512.

The ramp generation circuitry 550 may include a ramp capacitor 508 coupled in series with the resistor 520 via the path 509. The operational amplifier 551 may have its inverting input coupled to node 506 and its non-inverting input configured to receive a voltage representative of the output voltage of the DC to DC converter 100B, e.g., $V_{SET}$ or $V_{OUT}$. The operational amplifier 551 may function as an integrator. If the non-inverting input terminal receives $V_{OUT}$, the voltage level at node 506 at one end of the resistor 520 may also be equal to $V_{OUT}$. The current that flows through the resistor 520 may also flow through the ramp capacitor 508 to charge or discharge the ramp capacitor 508, so as to control the ramp signal 512.

The ramp signal 512 may be provided to the non-inverting input terminal of the first comparator 501 and the inverting input terminal of the second comparator 502. The voltage level V2 may be provided to the inverting input terminal of the first comparator 501. The REF voltage may be provided to the non-inverting input terminal of the second comparator 502. In one embodiment, REF may be 0.01 volts and V2 may be 2.5 volts.

Figure 6:
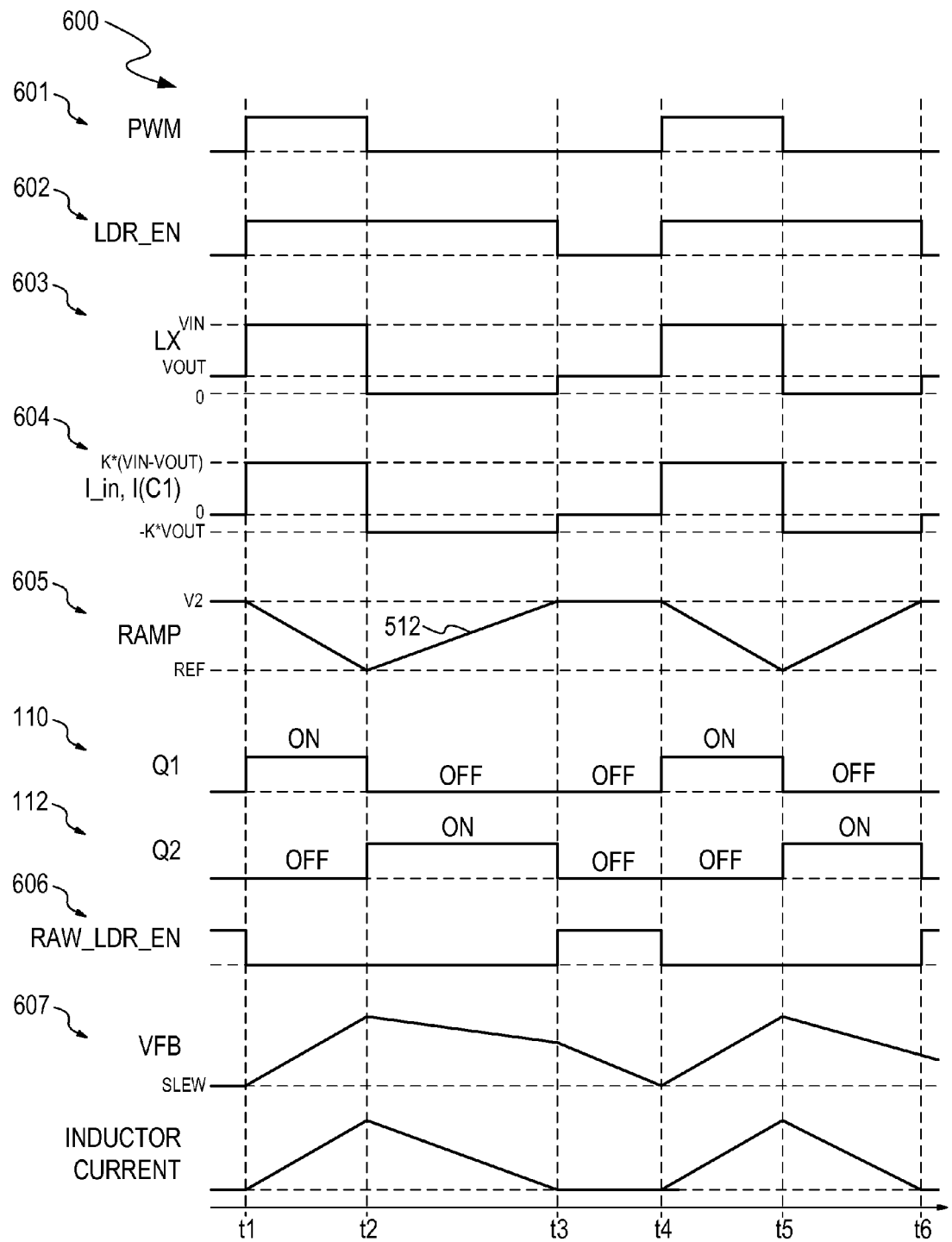
FIG. 6 illustrates a timing diagram of examples of signals associated with the controller shown in FIG. 5.

Turning to FIG. 6 in conjunction with FIG. 5, a timing diagram 600 to further illustrate operation of the controller 102B of FIG. 5 including generation of the ramp signal 512 is illustrated. During the time interval between times t1 and t2, the PWM signal shown in plot 601 is a digital one and the LDR_EN signal shown in plot 602 is also a digital one. Hence the high-side switch 110 is ON and the low-side switch 112 is OFF. The voltage level at the LX switching node 122 (as shown in plot 603) may be equal to $V_{IN}$ between times t1 and t2 since the LX switching node 122 is tied to the input voltage $V_{IN}$ of the DC to DC converter 100B during this time interval. The current I_in shown in plot 604 through the resistor 520 during the t1 to t2 time interval and also through the ramp capacitor 508 [I(C1)] may be given by equations (3) and (4). In response to this current through the ramp capacitor 508, the ramp signal 512 in plot 605 may ramp down during the time interval between times t1 and t2. During times t1 and t2, the ramp signal 512 may have a negative slope because the current I_in in plot 604 may pass through the ramp capacitor 508 by way of the operational amplifier 551. The ramp signal 512 may therefore be inverted in comparison to ramp signal 312 of FIG. 4. Moreover, the polarity arrangement of the ramp capacitor 508 that provides the ramp signal 512 may be opposite of that of the ramp capacitor 308 that provides the ramp signal 312.

The ramp signal 512 may ramp down until it reaches the reference voltage REF input to the non-inverting input terminal of the second comparator 502. When the ramp signal 512 reaches the REF level at time t2, the output of the second comparator 502 may reset the flip flop 542 of FIG. 5. When the flip flop 542 is reset at time t2, the Q output of the flip flop 542 may become a digital zero and hence the PWM signal in plot 601 may be a digital zero. The RAW_LDR_EN signal shown in plot 606 output of the first comparator 501 may be a digital zero during the t2 to t3 time interval so the output of the NAND gate 511 of FIG. 5 (e.g., the LDR_EN signal in plot 602) may be a digital one. Accordingly, the switches 110 and 112 may be in a TOFF_BUCK state during the t2 to t3 time interval with the high-side switch 110 OFF and the low-side switch 112 ON. When the switches 110 and 112 are in this TOFF_BUCK state, the voltage level at the LX switching node 122 (as shown in plot 603) may be equal to 0 since the LX switching node 122 may be coupled to ground via the low-side switch 112.

The current I_in in plot 604 through the resistor 520 and through the ramp capacitor 508 [I(C1)] during the t2 to t3 time interval may be given by equations (5) and (6). In response, the ramp signal 512 may ramp up in proportion to the I_in and I(C1) current until it reaches the V2 level at time t3. At time t3, the output of the first comparator 501 (e.g., RAW_LDR_EN in plot 606) may go to a digital one. If the SKIP signal is also a digital one (e.g., so that the SKIP state is enabled) at time t3, the output, e.g., the LDR_EN signal in plot 602, of the NAND gate 511 may be a digital zero. At time t3, if the feedback voltage VFB is greater than the SLEW voltage, the AND gate 522 can receive a digital zero from the comparator 503 and output a digital zero to the flip flop 542, so as to maintain the PWM signal digital zero. Accordingly, between times t3 and t4, the controller 102B may be in the SKIP state. In response to the digital zero PWM signal in plot 601 and the digital zero LDR_EN signal in plot 602, both switches 110 and 112 may be off in the SKIP state. However, if the feedback voltage VFB is less than or equal to the SLEW voltage when the ramp signal 512 reaches the V2 voltage level, TON_BUCK state occurs and there is no SKIP state.

Accordingly, the voltage level at the LX switching node 122 (as shown in plot 603) may be equal to $V_{OUT}$ of the DC to DC converter 100B during the SKIP state when the switches 110 and 112 are OFF. In addition, the current passing through the resistor 520 and the ramp capacitor 508 may be equal to zero during the SKIP state. The controller 102B may keep the switches 110 and 112 in the SKIP state until the output voltage $V_{OUT}$ of the DC to DC converter 100B as represented by VFB (as shown in plot 607) falls to a set voltage level (e.g., SLEW). When this occurs at time t4, the output of the third comparator 503 of FIG. 5 may go to a digital one. The digital one from the third comparator 503 and from the first comparator 501 may cause the output of the AND gate 522 of FIG. 5 to go to a digital one to set the flip flop 542 and hence cause the PWM signal in plot 601 to go to a digital one. The process may then repeat itself as illustrated in the timing diagram 600 for times t4 to t6.

The controller 102B can be a CRC controller that controls the inductor current $I_{L1}$ to have a constant ripple magnitude. Specifically, during a TON_BUCK state, the following equation can be obtained:

$$I\_in = C1*(dV_{508}/dt) = C1*(-dV_{512}/dt) = C1*(-\Delta V_{512}/T_{ON}), \quad (11)$$

where $V_{508}$ represents a voltage across the ramp capacitor 508, $V_{512}$ represents a voltage level of the ramp signal 512, C1 represents the capacitance of the ramp capacitor 508, and $\Delta V_{512}$ represents the change in the voltage level $V_{512}$ during the TON_BUCK state. Based on equations (1), (4), and (11), the following equation can be obtained:

$$\Delta I_{L1} = -(\Delta V_{512}*C1)/(K*L), \quad (12)$$

where $\Delta I_{L1}$ represents the change in the inductor current $I_{L1}$ during the TON_BUCK state. Similarly, during a TOFF_BUCK state, the following equation can be obtained:

$$I\_in = C1*(dV_{508}/dt) = C1*(-dV_{512}/dt) = C1*(-\Delta V_{512}/T_{OFF}), \quad (13)$$

where $\Delta V_{512}$ represents the change in the voltage level $V_{512}$ during the TOFF_BUCK state. Based on equations (2), (6), and (13), the following equation can be obtained:

$$\Delta I_{L1} = -(\Delta V_{512}*C1)/(K*L), \quad (14)$$

where $\Delta I_{L1}$ represents the change in the inductor current $I_{L1}$ during the TOFF_BUCK state. Since the amount of the voltage change $\Delta V_{512}$ during each of the TON_BUCK and TOFF_BUCK states can be the same, the amount of the current change $\Delta I_{L1}$ during each of the TON_BUCK and TOFF_BUCK states can be the same.

In addition, similar to the controller 102A illustrated in FIG. 3, the controller 102B in FIG. 5 can increase the duty cycle of the PWM signal when the average voltage $V_{AVE}$ of the output voltage $V_{OUT}$ is less than the target voltage $V_{SET}$ at the SLEW terminal. The controller 102B can also decrease the duty cycle of the PWM signal when the average voltage $V_{AVE}$ is greater than the target voltage $V_{SET}$ at the SLEW terminal. As a result, the controller 102B can adjust the average voltage $V_{AVE}$ of the output voltage $V_{OUT}$ to the target voltage $V_{SET}$.

Figure 7:
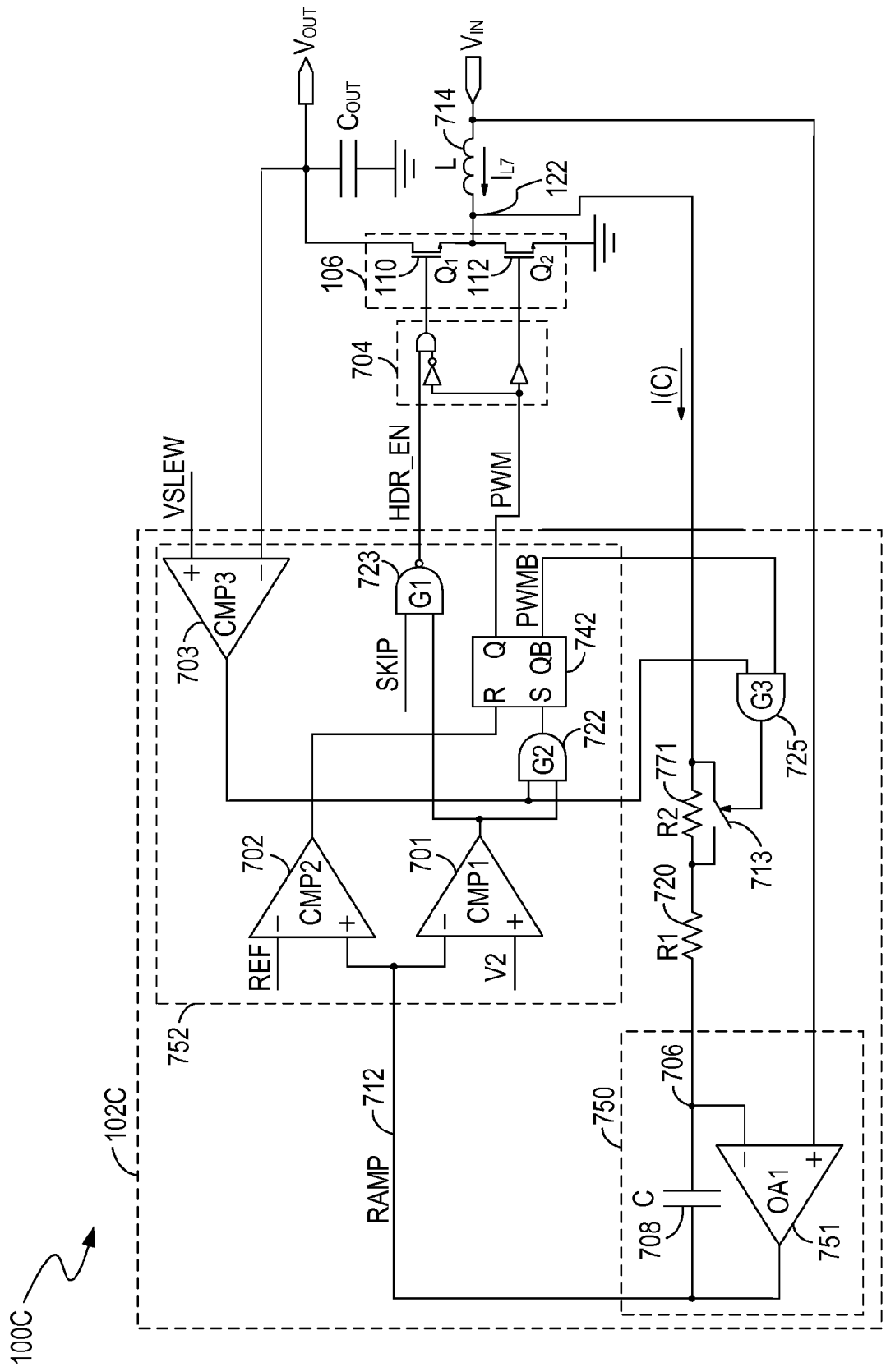
FIG. 7 illustrates a block diagram of an example of a controller, in accordance with one embodiment of the present invention.
Figure 8:
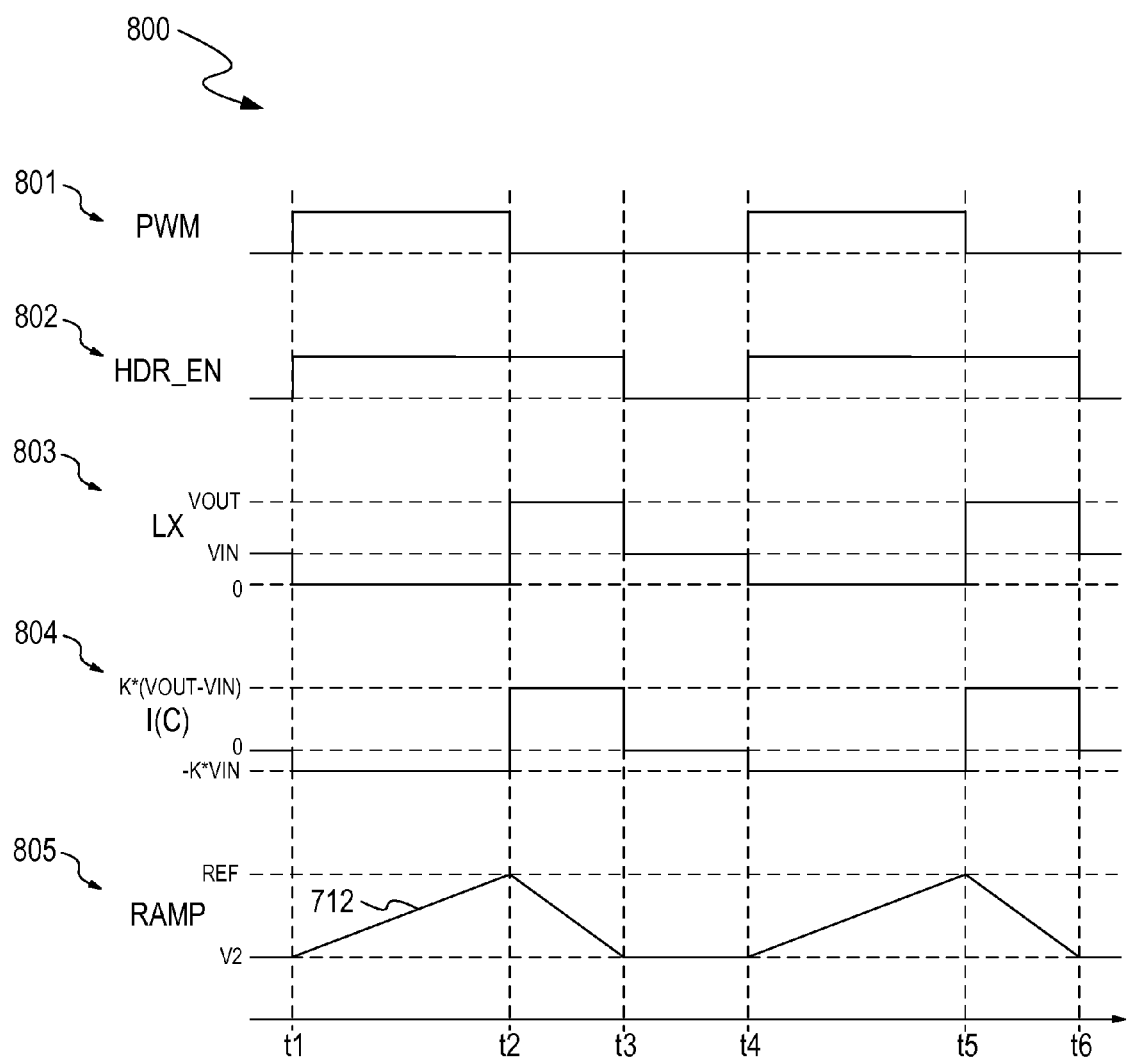
FIG. 8 illustrates a timing diagram of examples of signals associated with the controller shown in FIG. 7.

Referring now to FIG. 7 in conjunction with FIG. 8, yet another embodiment of the present disclosure including a converter 100C (for example, a boost converter) is shown. The converter 100C may include, inter alia, a controller 102C, a driver 704, and switches 110 and 112 which may be coupled to an inductor 714. The controller 102C may be configured to generate a control signal to the driver 704, which may then drive the high-side and low-side switches 110 and 112. In some embodiments, the controller 102C may adjust the duty cycle of converter 100C to control the switches 110 and 112, so as to control an inductor current $I_{L7}$ through the inductor 714, as well as the output voltage $V_{OUT}$ of the DC to DC converter 100C. The controller 102C may utilize a PWM signal to control the state of the high-side and low-side switches 110 and 112 by varying the duty cycle of the PWM signal.

In the example of FIG. 7, if the PWM signal is logic high, the low-side switch 112 may be ON and the high-side switch 110 may be OFF. This state of the switches 110 and 112 may be referred to herein as a "switch ON" state or a "TON_BOOST" state. In this state, the inductor 714 may be coupled to ground via the switching node 122. Accordingly, the inductor current $I_{L7}$ can flow through the inductor 714 from an input terminal (at an input voltage level $V_{IN}$ shown in FIG. 7) to ground, and may begin to ramp up. If the PWM signal is logic low and the HDR_EN signal is logic high, the low-side switch 112 may be OFF and the high-side switch 110 may be ON. This state of the switches 110 and 112 may be referred to as a "switch OFF" state or a "TOFF_BOOST" state. In a boost converter 100C, there may be a net negative voltage across the inductor 714 in this state. Accordingly, the inductor current $I_{L7}$ may begin to ramp down during this TOFF_BOOST state. Thus, the duty cycle of the PWM signal may determine the time on $T_{ON}$ for the TON_BOOST state and the time off $T_{OFF}$ for the TOFF_BOOST state. Similar to the buck converter, the controller 102C may utilize a ramp signal 712 to assist with generation of the PWM signal.

The controller 102C may include pulse-width modulation (PWM) circuitry 752 and ramp generation circuitry 750. The PWM circuitry 752 may include comparators 701, 702, 703, AND circuitry 722, NAND circuitry 723 and a SR latch 742. A first comparator 701 may be configured to provide inputs to the AND circuitry 722 as well as the NAND circuitry 723. The AND circuitry 722 may be configured to receive an additional input from a third comparator 703. The AND circuitry 722 may then generate an input to a flip-flop or a latch such as SR latch 742. The SR latch 742 may be configured to provide an input to the driver 704 and AND circuitry 725, which may be located externally to the PWM circuitry 752. The PWM circuitry 752 may be configured to receive a ramp signal 712 from the ramp generation circuitry 750 and generate a PWM signal in response to the ramp signal 712. The ramp generation circuitry 750 may include an operational amplifier 751 and a ramp capacitor 708 and may be responsive to a control current I(C) flowing through resistors 720 and 771 as discussed below.

The controller 102C may additionally include a switch 713 and the AND circuitry 725, which may have its inputs coupled to the output of the third comparator 703 of the PWM circuitry 752 and to the inverting output of the SR latch 742. The controller 102C may further include the resistors 720 and 771, which may be arranged in series and coupled to the switching node LX 122 of the DC to DC converter 100C.

As described herein, the resistor 720 in series with the resistor 771 may be denoted as an equivalent resistor that has resistance R equal to R1+R2. In some embodiments, the resistance R1 may be R/6 and the resistance R2 may be 5*R/6. Ramp generation circuitry 750 may also include the ramp capacitor 708 coupled in series with the resistors 720 and 771. Operational amplifier 751 may have its inverting input coupled to a node 706 associated with the serially coupled resistors 720 and 771, and its non-inverting input configured to receive a voltage representative of the input voltage of the DC to DC converter 100C, for example $V_{IN}$. The operational amplifier 751 may function as an integrator. The current that flows through the resistors 720 and 771 may also flow through the ramp capacitor 708 to charge or discharge the ramp capacitor 708, so as to control the ramp signal 712.

The ramp signal 712 may be provided to the inverting input terminal of first comparator 701 and the non-inverting input terminal of the second comparator 702. The voltage level V2 may be provided to the non-inverting input terminal of the first comparator 701. The REF voltage may be provided to the inverting input terminal of the second comparator 702. In some embodiments, REF may be 2.5 volts and V2 may be 10 mV.

When in the TOFF_BOOST state, the PWMB signal may be a logic one and the AND circuitry 725 may issue a logic one if the output voltage $V_{OUT}$ is less than VSLEW voltage. Thus, the switch 713 may be turned on, reducing the R value. The ramp signal 712 may be decrease rapidly down to the V2 level where the output of first comparator 701 may become a logic one, thus setting the SR latch 742. The PWMB signal may become a logic zero, therefore turning off the switch 713.

Referring now to FIG. 8, a timing diagram illustrating operation of the controller 102C of FIG. 7 is shown. In some embodiments, the PWM signal in plot 801 and the HDR_EN signal in plot 802 may be digital one between times t1 and t2. Thus, the low-side switch 112 may be ON and the high-side 110 switch may be OFF. The voltage level at the LX switching node 122 in plot 803 may be equal to zero volts between times t1 and t2. As shown in plot 804, during time t1 to time t2, the current I(C) through the resistors 720 and 771 and through the ramp capacitor 708 can be given by:

$$I(C)=-V_{IN}/R=-V_{IN}*K. \tag{15}$$

In response to this current I(C) through the ramp capacitor 708, the ramp signal 712 in plot 805 may ramp up during the time interval between times t1 and t2. During times t1 and t2, the ramp signal 712 may have a positive slope because the current I(C) in plot 804 may pass through the ramp capacitor 708 via the operational amplifier 751, e.g., flow from the output terminal of the operational amplifier 751 to the ramp capacitor 708.

Once the SR latch 742 is reset at time t2, the Q output of the SR latch 742 may become a digital zero and hence the PWM signal in plot 801 may be a digital zero. When the switches 110 and 112 are in this TOFF_BOOST state, the voltage level at the LX switching node 122 (as shown in plot 803) may be equal to the $V_{OUT}$ as detailed by FIG. 8. This may be a result of LX switching node 122 being coupled to the output voltage $V_{OUT}$ via the high-side switch 110.

The current I(C) (shown in plot 804) through resistors 720 and 771 during the time interval between times t2 and t3 may be given by the equation:

$$I(C)=(V_{OUT}-V_{IN})/R=(V_{OUT}-V_{IN})*K. \tag{16}$$

During the time interval between times t2 and t3, the ramp signal 712 may ramp down in proportion to the I(C) signal. The ramp signal 712 may ramp down until it reaches the voltage level V2 input to the non-inverting input terminal of the first comparator 701. At time t3, when the ramp signal 712 reaches the voltage level V2, the output of first comparator 701 may go to a digital one. Similarly to the ramp signal 512 and the inductor current $I_{L1}$ of FIG. 5, when the ramp signal 712 of FIG. 7 reaches the V2 voltage level at time t3, the inductor current $I_{L7}$ may be at a zero crossing. As such, the controller 102C may provide a zero crossing estimator of the inductor current $I_{L7}$ through the inductor 714 without directly measuring such current.

The controller 102C can be a CRC controller that controls the inductor current $I_{L7}$ to have a constant ripple magnitude. Specifically, during a TON_BOOST state, the following equation can be obtained:

$$dI_{L7}/dt = V_{IN}/L = \Delta I_{L7}/T_{ON}, \quad (17)$$

where $\Delta I_{L7}$ represents the change in the inductor current $I_{L7}$ during the TON_BOOST state. In addition, the following equation can be obtained:

$$I(C) = C^*(dV_{708}/dt) = C^*(-dV_{712}/dt) = C^*(-\Delta V_{712}/T_{ON}), \quad (18)$$

where $V_{708}$ represents a voltage across the ramp capacitor 708, $V_{712}$ represents a voltage level of the ramp signal 712, C represents the capacitance of the ramp capacitor 708, and $\Delta V_{712}$ represents the change in the voltage level $V_{712}$ during the TON_BOOST state. Based on equations (15), (17), and (18), the following equation can be obtained:

$$\Delta I_{L7} = (\Delta V_{712} * C)/(K*L). \quad (19)$$

Similarly, during a TOFF_BOOST state, the following equation can be obtained:

$$dI_{L7}/dt = (V_{IN} - V_{OUT})/L = \Delta I_{L7}/T_{OFF}, \quad (20)$$

where $\Delta I_{L7}$ represents the change in the inductor current $I_{L7}$ during the TOFF_BOOST state. In addition, the following equation can be obtained:

$$I(C) = C^*(dV_{708}/dt) = C^*(-dV_{712}/dt) = C^*(-\Delta V_{712}/T_{OFF}), \quad (21)$$

where $\Delta V_{712}$ represents the change in the voltage level $V_{712}$ during the TOFF_BOOST state. Based on equations (16), (20), and (21), the following equation can be obtained:

$$\Delta I_{L7} = (\Delta V_{712} * C)/(K*L). \quad (22)$$

Since the amount of the voltage change $\Delta V_{712}$ during each of the TON_BOOST and TOFF_BOOST states can be the same, the amount of the current change $\Delta I_{L7}$ during each of the TON_BOOST and TOFF_BOOST states can be the same.

In addition, similar to the controller 102A illustrated in FIG. 3 and the controller 102B illustrated in FIG. 5, the controller 102C in FIG. 7 can increase the duty cycle of the PWM signal when the average voltage $V_{AVE}$ of the output voltage $V_{OUT}$ is less than the target voltage $V_{SET}$ at the SLEW terminal. The controller 102C can also decrease the duty cycle of the PWM signal when the average voltage $V_{AVE}$ is greater than the target voltage $V_{SET}$ at the SLEW terminal. As a result, the controller 102C can adjust the average voltage $V_{AVE}$ of the output voltage $V_{OUT}$ to the target voltage $V_{SET}$.

Specifically, during a TOFF_BOOST state, if the output voltage $V_{OUT}$ is still greater than the VSLEW voltage when the ramp signal 712 decreases to the voltage level V2, the third comparator 703 can output a logic zero to maintain the PWM signal logic zero, e.g., via the AND gate 722 and the SR latch 742, until the output voltage $V_{OUT}$ decreases to the VSLEW voltage. The duration of the TOFF_BOOST state therefore can increase, so as to reduce the duty cycle of the PWM signal. If the output voltage $V_{OUT}$ decreases to the VSLEW voltage before the ramp signal 712 decreases to the voltage level V2, the third comparator 703 can output a logic one to turn on the switch 713 via the AND gate 725, so as to reduce the resistance of the path between the node 706 and the switching node 122. The current I(C) through the ramp capacitor 708 can increase, so as to shorten the time for the TOFF_BOOST state. The duty cycle of the PWM signal therefore can increase. As a result, the average voltage $V_{AVE}$ of the output voltage $V_{OUT}$ can be adjusted to the VSLEW voltage.

Figure 9:
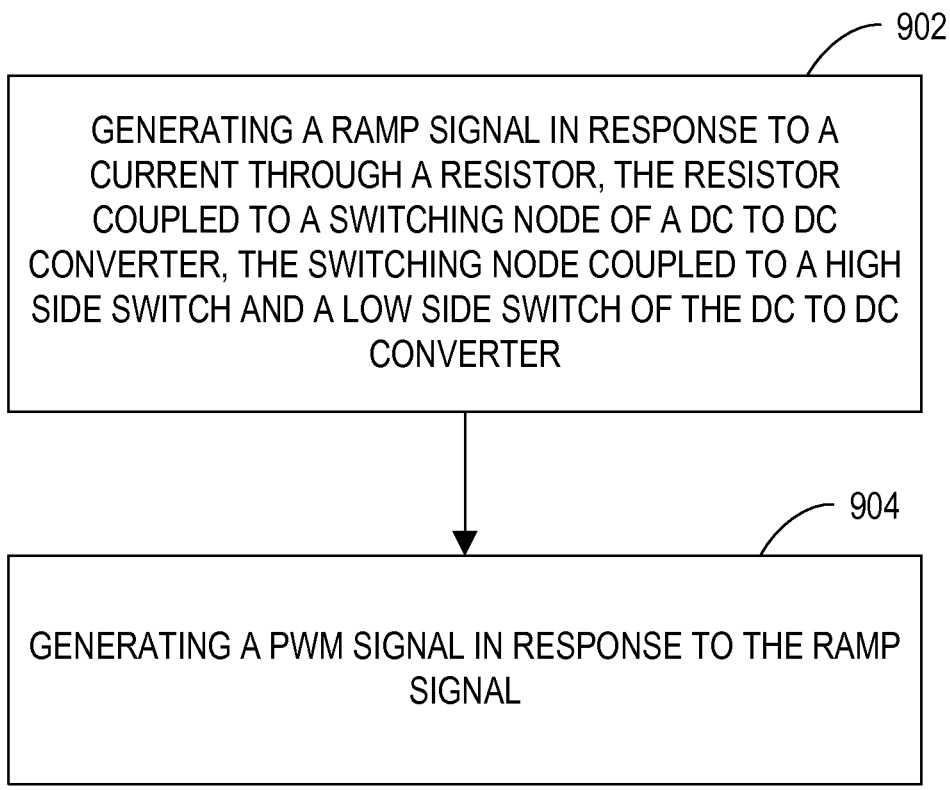
FIG. 9 illustrates a flowchart of examples of operations performed by the controller shown in FIG. 1.

FIG. 9 illustrates operations 900 according to an embodiment. Operation 902 may include generating a ramp signal in response to a current through a resistor that is coupled to a switching node of a DC to DC converter. The switching node can be coupled to a high-side switch and a low-side switch of the DC to DC converter. Operation 904 may include generating a PWM signal in response to the ramp signal.

Figure 1A:
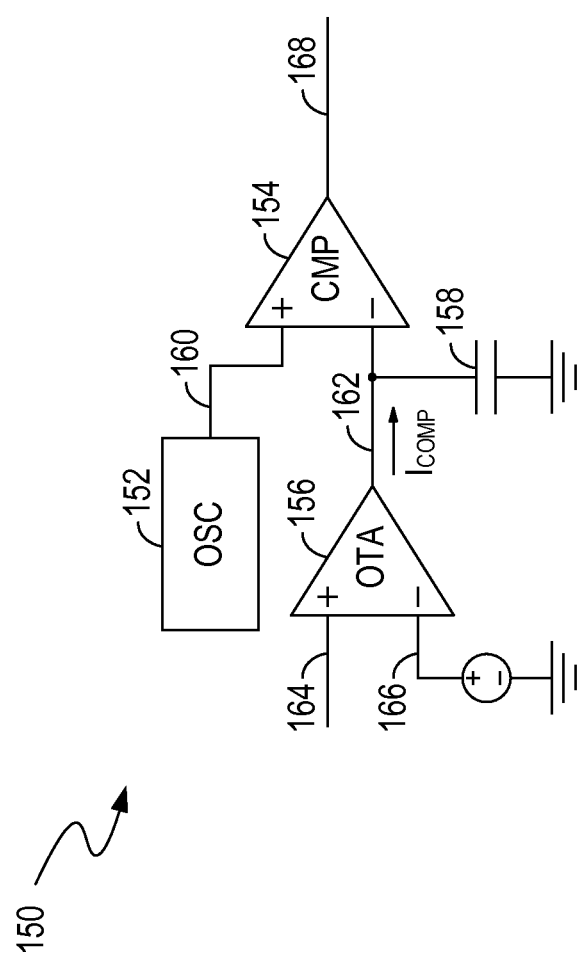
FIG. 1A illustrates a controller for a DC to DC converter, in accordance with the prior art.

Embodiments of the present invention provide DC to DC converters, e.g., buck converters, boost converters, to convert an input voltage $V_{IN}$ to an output voltage $V_{OUT}$. By way of examples, FIG. 3 and FIG. 5 provide buck converters 100A and 100B, and FIG. 7 provides a boost converter 100C. The DC to DC converter includes a CRC controller (e.g., 102A, 102B, or 102C) that generates a ramp signal to control an output current (e.g., the inductor current $L_{L1}$ or $I_{L7}$) of the DC to DC converter. The ramp signal can be generated by using a control current (e.g., I_out, or I(C)) to charge or discharge a ramp capacitor (e.g., 308, 508, or 708), and therefore can vary in proportion to the control current. In addition, the inductor current (e.g., $I_{L1}$ or $I_{L7}$) can vary in proportion to a voltage across the inductor (e.g., 114 or 714). Since the control current can be proportional to the voltage across the inductor; see equations (4), (6), (15) and (16), the ramp signal can be proportional to the inductor current. As such, advantageously, the ripple magnitude of the inductor current can be controlled to be substantially constant by controlling the ripple magnitude of the ramp signal to be substantially constant. In addition, the OTA 156 (shown in FIG. 1A) that has a relatively narrow bandwidth can be omitted, such that the CRC controller can control the output of the DC to DC converter more accurately. Moreover, the capacitor 158 with a relatively high capacitance and relatively large size can be omitted. All the components included in the CRC controller 102A, 102B, or 102C can be integrated into a single chip. Furthermore, the oscillator in the conventional controller can be omitted, so as to reduce the power consumption.

A method for adjusting the control current to be proportional to the voltage across the inductor can include controlling a voltage across a resistor, e.g., 320, 520, or 720-771, to be equal to or proportional to the voltage across the inductor. For example, the resistor has a first end and a second end, and the inductor has a first terminal and a second terminal. The first end of the resistor and the first terminal of the inductor can be coupled to the same node, e.g., the switching node 122. A voltage at the second end of the resistor can be controlled to be approximately equal to a voltage at the second terminal of the inductor. In the examples of FIG. 3, FIG. 5, and FIG. 7, the DC to DC converters 100A, 100B, and 100C respectively include operational amplifiers 351, 551, and 751. The operational amplifier can transfer the voltage at the second terminal of the inductor to the second end of the resistor. However, various methods and/or means can be used to control the voltage at the second end of the resistor to be approximately equal to the voltage at the second terminal of the inductor.

Figure 10A:
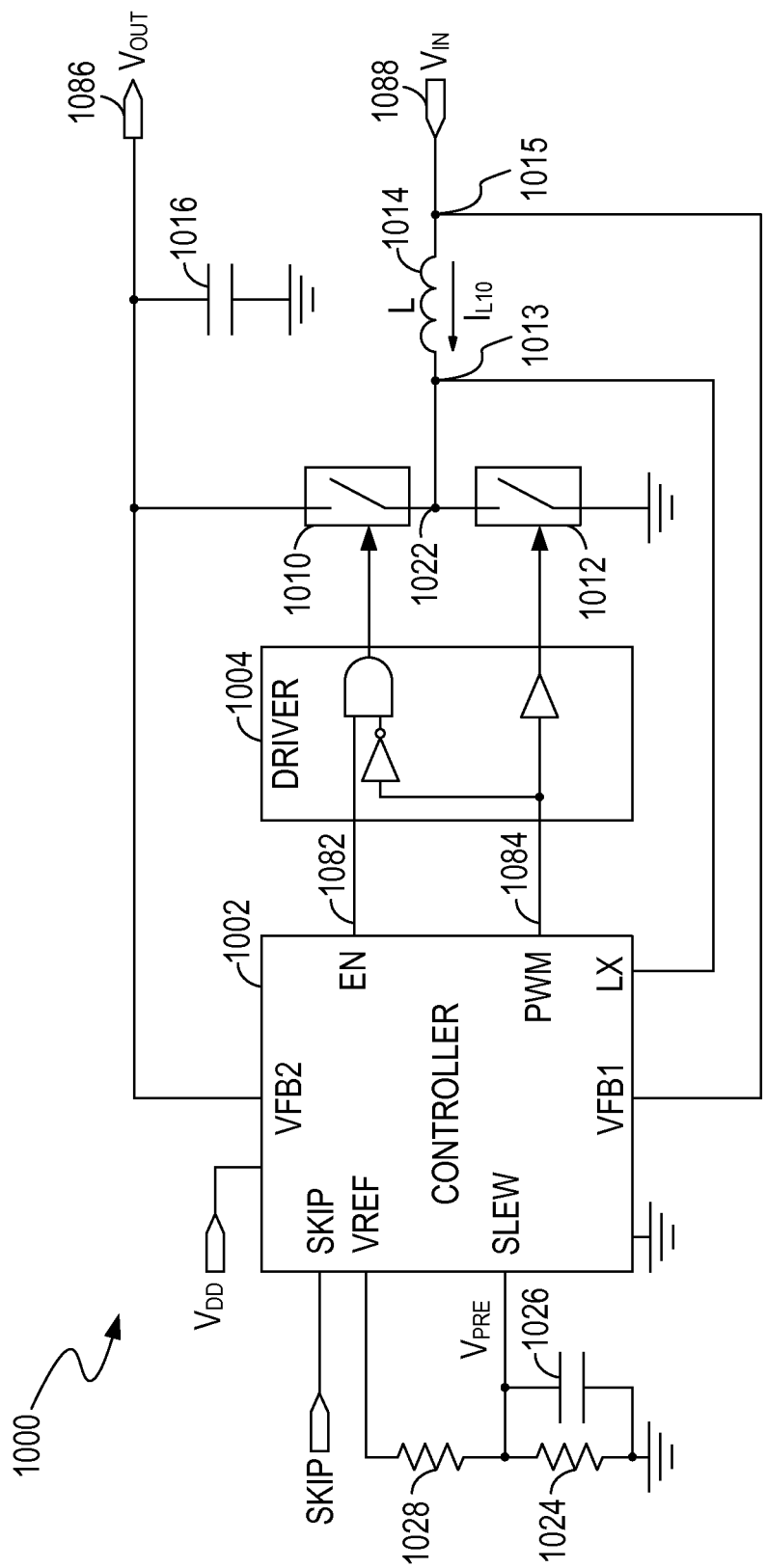
FIG. 10A illustrates a block diagram of an example of a DC to DC converter, in accordance with one embodiment of the present invention.

FIG. 10A illustrates a block diagram of an example of a DC to DC converter 1000, in accordance with one embodiment of the present invention. In the example of FIG. 10A, the DC to DC converter 1000 is a boost converter that converts an input voltage $V_{IN}$ at a low-side terminal 1088 to an output voltage $V_{OUT}$ at a high-side terminal 1086. As shown in FIG. 10A, the DC to DC converter 1000 includes a controller 1002, a driver 1004, a switching circuit that includes a high-side switch 1010 and a low-side switch 1012, and an energy storage component 1014.

In the example of FIG. 10A, a high-side path between the energy storage component 1014 and the high-side terminal 1086 includes the high-side switch 1010, and a low-side path between the energy storage component 1014 and ground includes the low-side switch 1012. However, in an alternative embodiment, the high-side switch 1010 can replaced by a diode. The energy storage component 1014 can be, but is not limited to, an inductor. The inductor 1014 includes a first terminal 1013 coupled to a switching node 1022 between the high-side switch 1010 and the low-side switch 1012 and a second terminal 1015 coupled to the low-side terminal 1088. The inductor 1014 is used to provide the output voltage $V_{OUT}$ of the DC to DC converter 1000.

The controller 1002 can include an enable output terminal EN to provide a high-side switch enable (HDR_EN) signal 1082, and a control output terminal PWM to provide a PWM signal 1084. The controller 1002 can also include an input terminal LX to receive a voltage at the first terminal 1013 of the inductor 1014, an input terminal VFB1 to receive a feedback voltage at the second terminal 1015 of the inductor 1014, and an input terminal VFB2 to receive the output voltage $V_{OUT}$ at the high-side terminal 1086. The controller 1002 may also include an input terminal SKIP to receive a SKIP signal that controls whether the HDR_EN signal 1082 is effective. Furthermore, the controller 1002 may include an output terminal VREF and an input terminal SLEW. In one embodiment, the input terminal SLEW sets a target level or a desired level for the output voltage $V_{OUT}$. In the example of FIG. 10A, a slew capacitor 1026 coupled to the input terminal SLEW is charged based on a resistance ratio of a resistor divider (shown as resistors 1024 and 1028) and the voltage level at the output terminal VREF, so as to provide a preset voltage $V_{PRE}$ to the input terminal SLEW. However, the invention is not so limited; other alternative methods can be used to charge the slew capacitor 1026 and create a preset voltage $V_{PRE}$ to the input terminal SLEW.

In one embodiment, when the high-side switch 1010 is off and the low-side switch 1012 is on, the first terminal 1013 of the inductor 1014 is coupled to ground via the low-side switch 1012, and a net positive voltage, e.g., $V_{IN}$, is across the inductor 1014. An inductor current $I_{L10}$ through the inductor 1014 can increase in proportion to the voltage $V_{IN}$ across the inductor 1014. The following equation is obtained:

$$dI_{L10}/dt = V_{IN}/L, \quad (23)$$

where L represents the inductance of the inductor 1014. When the high-side switch 1010 is on and the low-side switch 1012 is off, the first terminal 1013 of the inductor 1014 is coupled to the high-side terminal 1086 via the high-side switch 1010, and a net negative voltage, e.g., $V_{IN}-V_{OUT}$, is across the inductor 1014. The inductor current $I_{L10}$ can decrease in proportion to the voltage $V_{IN}-V_{OUT}$ across the inductor 1014. The following equation is obtained:

$$dI_{L10}/dt = (V_{IN}-V_{OUT})/L. \quad (24)$$

In one such embodiment, the current $I_{L10}$ is a ripple current. The current $I_{L10}$ flows to the high-side terminal 1086 when the high-side switch 1010 is on and the low-side switch 1012 is off. An energy storage component, e.g., an output capacitor 1016, coupled between the high-side terminal 1086 and ground is charged by the current $I_{L10}$ and provides the output voltage $V_{OUT}$. By turning on and off the switches 1010 and 1012 alternately, the controller 1002 can adjust the output voltage $V_{OUT}$ or an average voltage $V_{AVE}$ of the output voltage $V_{OUT}$ to a target voltage $V_{TARGET}$. In addition, the controller 1002 can control the current $I_{L10}$ to have a substantially constant ripple magnitude. As such, the output voltage $V_{OUT}$ of the DC to DC converter 1000 can be more stable.

In one embodiment, the controller 1002 generates control signals such as the HDR_EN signal 1082 and the PWM signal 1084 to the driver 1004 to control/drive the high-side switch 1010 and the low-side switch 1012. For example, the high-side switch 1010 can be turned on by a logic-high signal and turned off by a logic-low signal. Similarly, the low-side switch 1012 can be turned on by a logic-high signal and turned off by a logic-low signal. By controlling the logic level of the HDR_EN signal 1082 and the PWM signal 1084, the status the high-side switch 1010 and the low-side switch 1012 can be controlled.

Examples of the status of the high-side switch 1010 and the low-side switch 1012 in response to the control signals 1082 and 1084 are illustrated by a table 1100 in FIG. 11. The table 1100 is described in combination with FIG. 10A.

As shown in the table 1100, when the HDR_EN signal and the PWM signal are logic high, i.e., HDR_EN=1 and PWM=1, the high-side switch 1010 is off and the low-side switch 1012 is on. Such state can be referred to as a TON_BOOST state. When the HDR_EN signal is logic low and the PWM signal is logic high, i.e., HDR_EN=0 and PWM=1, the high-side switch 1010 is off and the low-side switch 1012 is on. Thus, the switches 1010 and 1012 are also in the TON_BOOST state. During the TON_BOOST state, the first terminal 1013 of the inductor 1014 is coupled to ground, the voltage across the inductor 1014 can be equal to $V_{IN}$, and the current $I_{L10}$ increases. When the HDR_EN signal is logic high and the PWM signal is logic low, i.e., HDR_EN=1 and PWM=0, the high-side switch 1010 is on and the low-side switch 1012 is off. Such state can be referred to as a TOFF_BOOST state. During the TOFF_BOOST state, the first terminal 1013 of the inductor 1014 is coupled to the high-side terminal 1086, the voltage across the inductor 1014 can be equal to $V_{IN}-V_{OUT}$, and the current $I_{L10}$ decreases. When the HDR_EN signal and the PWM signal are logic low, i.e., HDR_EN=0 and PWM=0, the high-side switch 1010 and the low-side switch 1012 are both off. Such state can be referred to as a SKIP state. During the SKIP state, the first terminal 1013 of the inductor 1014 can be floating, e.g., is not coupled to the high-side terminal 1086 nor coupled to ground, the voltage across the inductor 1014 can be zero, and the current $I_{L10}$ can be zero.

Figure 10B:
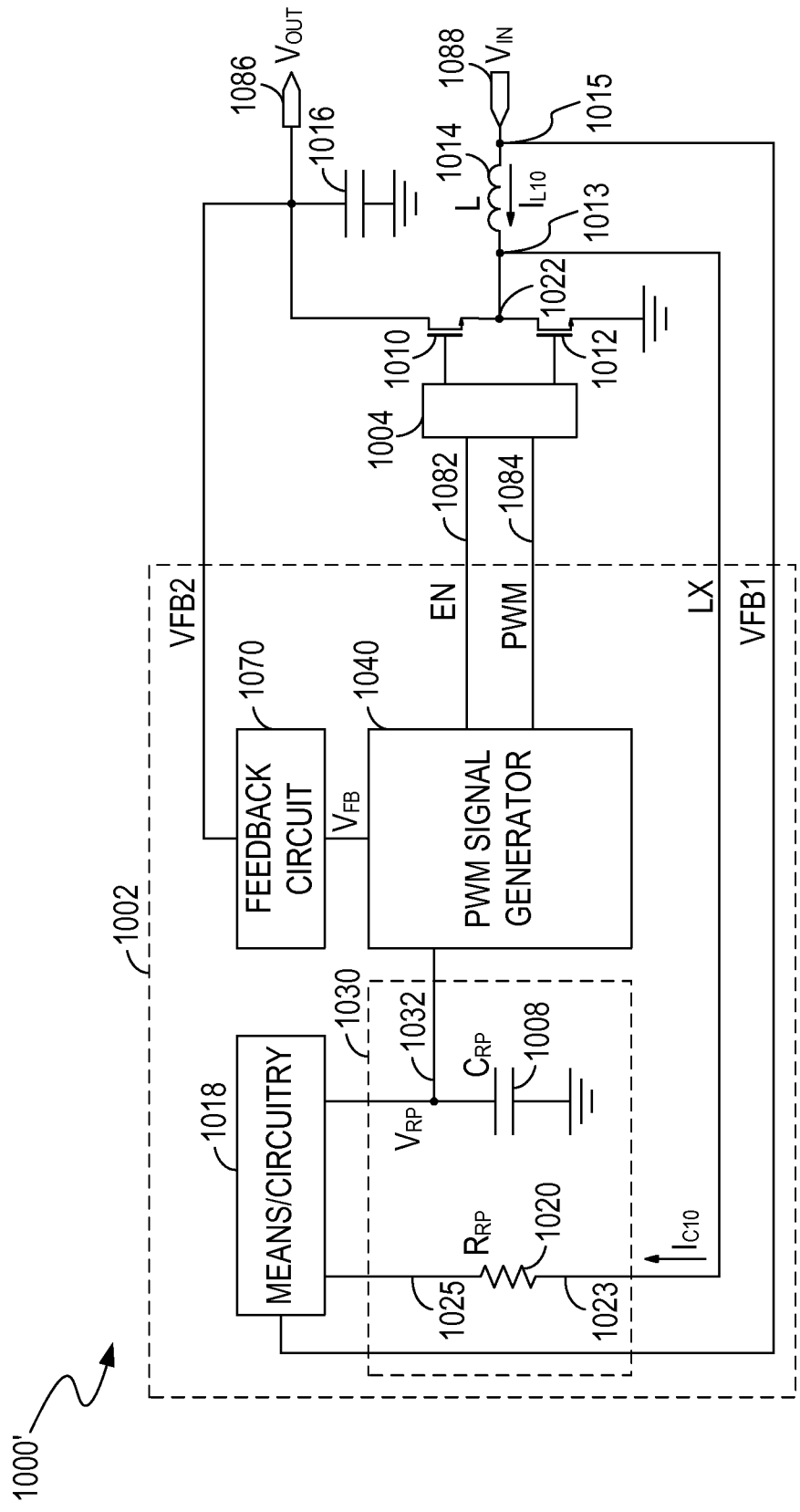
FIG. 10B illustrates a block diagram of an example of a DC to DC converter, in accordance with one embodiment of the present invention.

FIG. 10B illustrates a block diagram of an example of a DC to DC converter 1000', in accordance with one embodiment of the present invention. Elements that are labeled the same as in FIG. 10A have similar functions. As shown in FIG. 10B, the controller 1002 includes a ramp signal generator 1030, a PWM signal generator 1040, and a feedback circuit 1070. The ramp signal generator 1030 includes an energy storage component, e.g., a ramp capacitor 1008, and a resistive component, e.g., a resistor 1020. The ramp capacitor 1008 is coupled between ground and the PWM signal generator 1040. The resistor 1020 has a first end 1023 coupled to the first terminal 1013 of the inductor 1014 and a second end 1025 coupled to the ramp capacitor 1008, e.g., via means/circuitry 1018.

In one embodiment, the ramp signal generator 1030 provides a control current $I_{C10}$ through the resistor 1020 to control electric energy stored in the ramp capacitor 1008. The ramp signal generator 1030 further generates a ramp signal 1032, e.g., a voltage across the ramp capacitor 1008, based on the electric energy stored in the ramp capacitor 1008. Control circuitry that includes the PWM signal generator 1040 and the circuitry 1018 controls the control current $I_{C10}$ to indicate, e.g., be linearly proportional to, a voltage across the inductor 1014 by adjusting a voltage at one end of the resistor 1020. The control circuitry further controls the current $I_{L10}$ through the inductor 1014 within a predetermined range based on the ramp signal 1032.

More specifically, in one embodiment, a voltage $V_{1023}$ at the first end 1023 of the resistor 1020 is equal to a voltage $V_{1013}$ at the first terminal 1013 of the inductor 1014. The means/circuitry 1018 controls a voltage $V_{1025}$ at the second end 1025 of the resistor 1020 towards a voltage $V_{1015}$ at the second terminal 1015 of the inductor 1014. As such, a voltage across the resistor 1020 is approximately equal to a voltage across the inductor 1014. The control current $I_{C10}$ through the resistor 1020, therefore, is linearly proportional to the voltage $V_{1013}-V_{1015}$ across the inductor 1014, and can be given by: $I_{C10}=(V_{1013}-V_{1015})/R_{RP}$. $R_{RP}$ represents the resistance of the resistor 1020. The means/circuitry 1018 can be included in the PWM signal generator 1040, or in the ramp signal generator 1030, or in a combined circuit of the PWM signal generator 1040 and the ramp signal generator 1030, or is outside the PWM signal generator 1040 and the ramp signal generator 1030.

In one embodiment, the control current $I_{C10}$ controls the electric energy stored in the ramp capacitor 1008 to adjust the ramp signal 1032, e.g., the voltage across the ramp capacitor 1008. For example, during a TON_BOOST state, the control current $I_{C10}$ is given by:

$$I_{C10}=(V_{1013}-V_{1015})/R_{RP}=(0-V_{IN})/R_{RP}. \quad (25)$$

Therefore, the following equation is obtained:

$$I_{C10}=C_{RP}*dV_{RP}/dt=-V_{IN}/R_{RP}, \quad (26)$$

where $C_{RP}$ represents the capacitance of the ramp capacitor 1008, and $V_{RP}$ represents a voltage level of the ramp signal 1032. Thus, during the TON_BOOST state, the control current $I_{C10}$ can discharge the ramp capacitor 1008 to decrease the ramp signal 1032. Similarly, during a TOFF_BOOST state, the control current $I_{C10}$ is given by:

$$I_{C10}=(V_{1013}-V_{1015})/R_{RP}=(V_{OUT}-V_{IN})/R_{RP}. \quad (27)$$

The flowing equation is obtained:

$$I_{C10}=C_{RP}*dV_{RP}/dt=(V_{OUT}-V_{IN})/R_{RP}. \quad (28)$$

Thus, during the TOFF_BOOST state, the control current $I_{C10}$ can charge the ramp capacitor 1008 to increase the ramp signal 1032.

Based on equations (23) and (26), the following equations are obtained:

$$\Delta I_{L10}/T_{ON}=V_{IN}/L; \quad (29a)$$

and $$C_{RP}*\Delta V_{RP}/T_{ON}=-V_{IN}/R_{RP}, \quad (29b)$$

where $\Delta I_{L10}$ represents the change in the current $I_{L10}$ during the TON_BOOST state, $\Delta V_{RP}$ represents the change in the voltage level $V_{RP}$ during the TON_BOOST state, and $T_{ON}$ represents a time duration for the TON_BOOST state. Based on equations (29a) and (29b), the following equation is obtained:

$$\Delta I_{L10}=-C_{RP}*\Delta V_{RP}*R_{RP}/L. \quad (30)$$

Similarly, based on equations (24) and (28), the following equations are obtained:

$$\Delta I_{L10}/T_{OFF}=(V_{IN}-V_{OUT})/L; \text{ and} \quad (31a)$$

$$C_{RP}*\Delta V_{RP}/T_{OFF}=(V_{OUT}-V_{IN})/R_{RP}, \quad (31b)$$

where $\Delta I_{L10}$ represents the change in the current $I_{L10}$ during the TOFF_BOOST state, $\Delta V_{RP}$ represents the change in the voltage level $V_{RP}$ during the TOFF_BOOST state, and $T_{OFF}$ represents a time duration for the TOFF_BOOST state. Based on equations (31a) and (31b), the following equation is obtained:

$$\Delta I_{L10}=-C_{RP}*\Delta V_{RP}*R_{RP}/L. \quad (32)$$

The PWM signal generator 1040 can control the pair of switches 1010 and 1012 based on the ramp signal 1032, so as to control the current $I_{L10}$ through the inductor 1014. Specifically, the PWM signal generator 1040 can generate the PWM signal 1084 to control the high-side switch 1010 and the low-side switch 1012. The PWM signal generator 1040 can further control a state of the PWM signal 1084, so that the ramp signal 1032 has a substantially constant ripple magnitude. Based on equations (30) and (32), the controller 1002 can control the ripple magnitude $\Delta I_{L10}$ of the current $I_{L10}$ to be substantially constant by controlling the ripple magnitude $\Delta V_{RP}$ of the ramp signal 1032 to be substantially constant. Thus, the controller 1002 can be a CRC controller.

Furthermore, the PWM signal generator 1040 can control the pair of switches 1010 and 1012 based on the ramp signal 1032, so as to control the output voltage $V_{OUT}$ of the DC to DC converter 1000'. Specifically, the feedback circuit 1070 receives the output voltage $V_{OUT}$ via the input terminal VFB2 and generates a feedback voltage $V_{FB}$ indicative of the output voltage $V_{OUT}$ to the PWM signal generator 1040. The PWM signal generator 1040 can control the duty cycle of the PWM signal 1084 based on the feedback voltage $V_{FB}$. For example, the PWM signal generator 1040 increases the duty cycle of the PWM signal 1084 if an average voltage $V_{AVE}$ of the output voltage $V_{OUT}$ is less than a target voltage $V_{TARGET}$, and decreases the duty cycle if the average voltage $V_{AVE}$ is greater than the target voltage $V_{TARGET}$. The average voltage $V_{AVE}$ of the output voltage $V_{OUT}$ therefore is adjusted to the target voltage $V_{TARGET}$.

Figure 12:
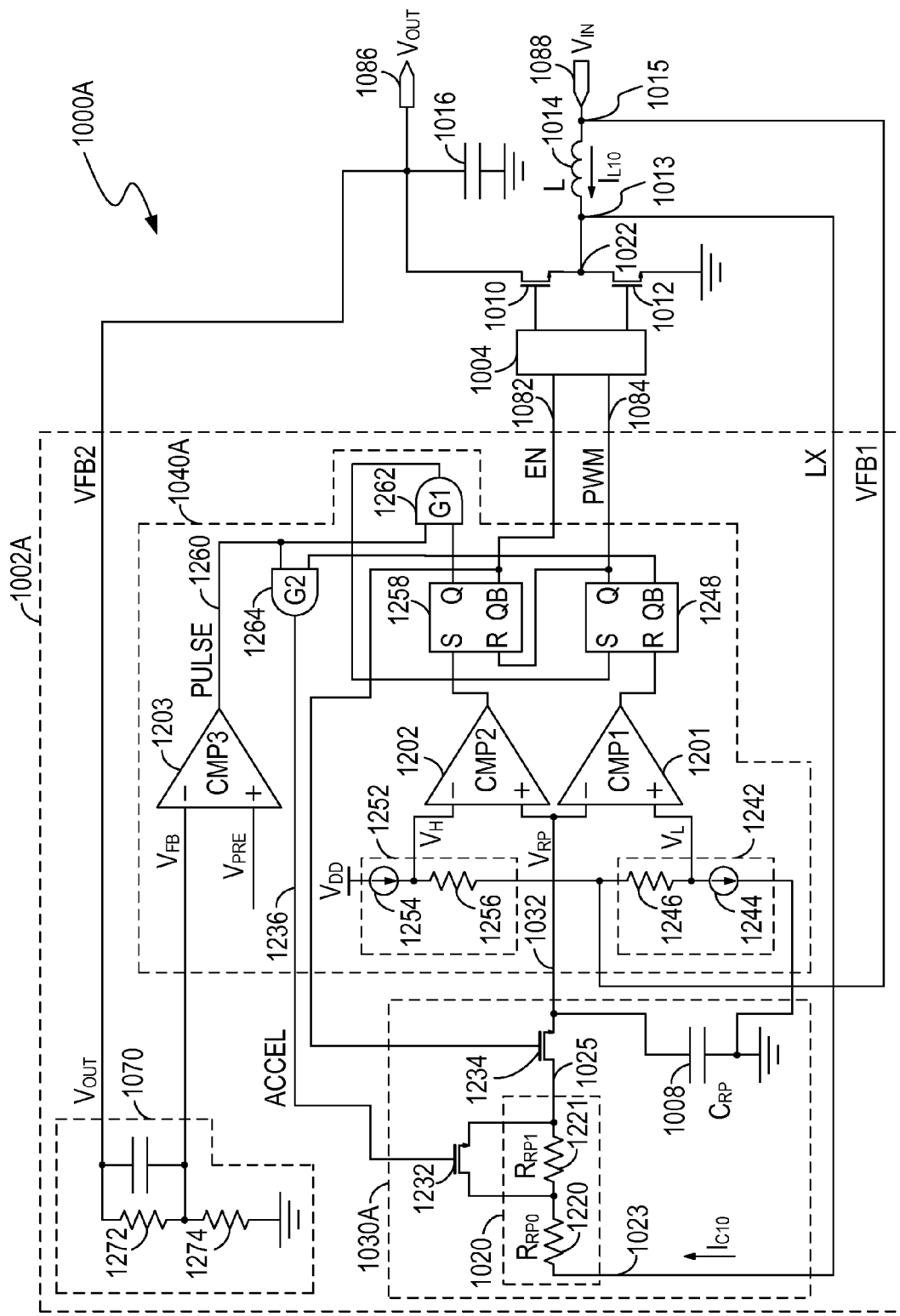
FIG. 12 illustrates a circuit diagram of an example of a DC to DC converter, in accordance with one embodiment of the present invention.

FIG. 12 illustrates a circuit diagram of an example of a DC to DC converter 1000A, in accordance with one embodiment of the present invention. Elements that are labeled the same as in FIG. 10A and FIG. 10B have similar functions. As shown in FIG. 12, a controller 1002A includes a ramp signal generator 1030A, a PWM signal generator 1040A, and a feedback circuit 1070.

The ramp signal generator 1030A can include the resistor 1020, the ramp capacitor 1008, a switch 1232, and a switch 1234. The first end 1023 of the resistor 1020 is coupled to the first terminal 1013 of the inductor 1014, and the second end 1025 of the resistor 1020 is coupled to the ramp capacitor 1008 via the switch 1234. The resistor 1020 in the example of FIG. 12 includes a sub-resistor 1220 and a sub-resistor 1221 coupled in series. The switch 1232 is coupled to the two ends of the sub-resistor 1221. The resistance $R_{RP}$ of the resistor 1020 is equal to resistance $R_{RP0}$ of the sub-resistor 1220 plus resistance $R_{RP}$ of the sub-resistor 1221.

The PWM signal generator 1040A can include a comparator 1201 (hereinafter CMP1 1201), a comparator 1202 (hereinafter CMP2 1202), an offset circuit 1242, an offset circuit 1252, a set-reset flip-flop (SRFF) 1248, an SRFF 1258, a logic AND gate 1262 (hereinafter G1 1262), a logic AND gate 1264 (hereinafter G2 1264), and a comparator 1203 (hereinafter CMP3 1203). As shown in FIG. 12, an inverting input terminal of the CMP1 1201 and a non-inverting input terminal of the CMP2 1202 are coupled to the ramp capacitor 1008, and coupled to the second end 1025 of the resistor 1020 via the switch 1234. A non-inverting input terminal of the CMP1 1201 is coupled to the second terminal 1015 of the inductor 1014 via the offset circuit 1242. An inverting input terminal of the CMP2 1202 is coupled to the second terminal 1015 of the inductor 1014 via the offset circuit 1252. The CMP3 1203 includes an inverting input terminal coupled to the feedback circuit 1070, a non-inverting input terminal coupled to a voltage source (not shown in FIG. 12) that provides a preset voltage $V_{PRE}$, and an output terminal coupled to the G1 1262 and the G2 1264. The SRFF 1248 includes a reset terminal R coupled to an output terminal of the CMP1 1201, a set terminal S coupled to an output terminal of the G1 1262, a non-inverting output terminal Q coupled to the control output terminal PWM of the controller 1002A, and an inverting output terminal QB coupled to an input terminal of the G2 1264. The SRFF 1258 includes a reset terminal R coupled to the non-inverting output terminal Q of the SRFF 1248, a set terminal S coupled to an output terminal of the CMP2 1202, a non-inverting output terminal Q coupled to an input terminal of the G1 1262, and an inverting output terminal QB coupled to the enable output terminal EN of the controller 1002A. Input terminals of the G1 1262 are coupled to the non-inverting output terminal Q of the SRFF 1258 and the output terminal of the CMP3 1203, and an output terminal of the G1 1262 is coupled to the set terminal S of the SRFF 1248. Input terminals of the G2 1264 are coupled to the inverting output terminal QB of the SRFF 1248 and the output terminal of the CMP3 1203, and an output terminal of the G2 1264 is coupled to a control terminal of the switch 1232. In addition, the inverting output terminal QB of the SRFF 1258 is coupled to a control terminal of the switch 1234.

In one embodiment, the CMP1 1201 receives a reference voltage $V_L$ from the offset circuit 1242 and outputs a signal to the SRFF 1248 by comparing the ramp signal 1032 with the reference voltage $V_L$. The CMP1 1201 outputs a logic-high signal if the ramp signal 1032 is no greater than the reference voltage $V_L$, and outputs a logic-low signal if the ramp signal 1032 is greater than the reference voltage $V_L$. The CMP2 1202 receives a reference voltage $V_H$ ($V_H > V_L$) from the offset circuit 1252 and outputs a signal to the SRFF 1258 by comparing the ramp signal 1032 with the reference voltage $V_H$. The CMP2 1202 outputs a logic-high signal if the ramp signal 1032 is no less than the reference voltage $V_H$, and outputs a logic-low signal if the ramp signal 1032 is less than the reference voltage $V_H$.

In one embodiment, the SRFF 1248 is triggered by a rising edge of an input signal, e.g., a set signal or a reset signal. For example, if a rising edge of a set signal occurs at the set terminal S of the SRFF 1248, the non-inverting output terminal Q of the SRFF 1248 is set to logic high and the inverting output terminal QB of the SRFF 1248 is set to logic low. If a rising edge of a reset signal occurs at the reset terminal R of the SRFF 1248, the non-inverting output terminal Q of the SRFF 1248 is set to logic low and the inverting output terminal QB of the SRFF 1248 is set to logic high. If both the set terminal S and the reset terminal R are logic low, the logic levels at the output terminals Q and QB of the SRFF 1248 remain unchanged until a rising edge of an input signal of the SRFF 1248 occurs. The SRFF 1258 can be trigged by a rising edge of an input signal of the SRFF 1258 in a similar manner.

In one embodiment, the controller 1002A controls a ripple magnitude of the ramp signal 1032 and a ripple magnitude of the current $I_{L10}$ to be constant by comparing the ramp signal 1032 with the reference voltages $V_L$ and $V_H$. More specifically, the PWM signal generator 1040A controls a status of the PWM signal 1084 according to the comparison between the ramp signal 1032 and the reference voltages $V_L$ and $V_H$. When the ramp signal 1032 decreases to the reference voltage $V_L$, the CMP1 1201 outputs a logic-high signal to reset the SRFF 1248 to output a logic-low PWM signal 1084. As such, the ramp signal 1032 increases. When the ramp signal 1032 increases to the reference voltage $V_H$, the CMP2 1202 outputs a logic-high signal to set the PWM signal 1084 to logic high, e.g., via the SRFF 1258, the G1 1262, and the SRFF 1248. As such, the ramp signal 1032 decreases. Thus, the ramp signal 1032 can have a maximum level that is equal to the reference voltage $V_H$ and a minimum level that is equal to the reference voltage $V_L$. Accordingly, the current $I_{L10}$ can also have a maximum level and a minimum level, e.g., can be in a predetermined range based on the ramp signal 1032. The ripple magnitude of the ramp signal 1032 can be equal to a difference between the reference voltages $V_L$ and $V_H$. The difference $V_H-V_L$ can be constant, such that the ripple magnitude of the ramp signal 1032 is constant. As a result, the ripple magnitude of the current $I_{L10}$ is also constant.

In the example of FIG. 12, means/circuitry for controlling the voltage $V_{1025}$ at the second end 1025 of the resistor 1020 towards the voltage $V_{1015}$ at the second terminal 1015 of the inductor 1014 includes the CMP1 1201, the CMP2 1202, the offset circuit 1242, and the offset circuit 1252. Specifically, the CMP1 1201 compares the voltage $V_{1025}$ with the reference voltage $V_L$, thereby controlling the voltage $V_{1025}$ to be no less than the reference voltage $V_L$. The CMP2 1202 compares the voltage $V_{1025}$ with the reference voltage $V_H$, thereby controlling the voltage $V_{1025}$ to be no greater than the reference voltage $V_H$. A preset voltage across the offset circuit 1242 is $V_{S1}$, and a preset voltage across the offset circuit 1252 is $V_{S2}$. Thus, the reference voltage $V_L$ provided to the CMP1 1201 is equal to the voltage $V_{1015}$ minus the preset voltage $V_{S1}$, e.g., $V_L=V_{1015}-V_{S1}$, and the reference voltage $V_H$ provided to the CMP2 1202 is equal to the voltage $V_{1015}$ plus the preset voltage $V_{S2}$, e.g., $V_H=V_{1015}+V_{S2}$. In one embodiment, the preset voltage $V_{S1}$ across the offset circuit 1242 and the preset voltage $V_{S2}$ across the offset circuit 1252 are substantially constant. In one embodiment, the preset voltages $V_{S1}$ and $V_{S2}$ can be the same, e.g., $V_{S1}=V_{S2}$, such that the voltage $V_{1015}$ is centered between the reference voltages $V_L$ and $V_H$. In addition, compared with the voltage $V_{1015}$, the preset voltages $V_{S1}$ and $V_{S2}$ are relatively small and can be omitted, such that the voltage $V_{1025}$ that varies in the range from $V_L$ (e.g., $V_L=V_{1015}-V_{S1}$) to $V_H$ (e.g., $V_H=V_{1015}+V_{S2}$) can be considered to be approximately equal to the voltage $V_{1015}$.

In the example of FIG. 12, the offset circuit 1242 includes a resistor 1246 that has a resistance $R_{S1}$. The offset circuit 1242 further includes a current source 1244 to provide a preset current $I_{S1}$ through the resistor 1246, such that the resistor 1246 has the preset voltage $V_{S1}$, e.g., $V_{S1}=I_{S1}*R_{S1}$, thereon. Similarly, the offset circuit 1252 includes a resistor 1256 that has a resistance $R_{S2}$. The offset circuit 1252 further includes a current source 1254 to provide a preset current $I_{S2}$ through the resistor 1256, such that the resistor 1256 has the preset voltage $V_{S2}$, e.g., $V_{S2}=I_{S2}*R_{S2}$, thereon. However, the invention is not so limited; other alternative methods can be used to create the preset voltages across the offset circuits 1242 and 1252.

In the example of FIG. 12, the comparators 1201 and 1202 control the ramp signal 1032 to have a constant ripple magnitude and also control the voltage $V_{1025}$ towards the voltage $V_{1015}$. However, in another embodiment, the ramp signal 1032 and the voltage $V_{1025}$ can be controlled by different comparators. For example, one or more comparators can be used to control the ramp signal 1032 to have a constant ripple magnitude. Another one or more comparators can be used to control the voltage $V_{1025}$ towards the voltage $V_{1015}$. In one such embodiment, the range of the ramp signal 1032 can be the same as or different from the range of the voltage $V_{1025}$. In one such embodiment, a current-controlled current source, e.g., the circuit 324 in FIG. 3, can be used to generate a control current equal to the current through the resistor 1020 to control the ramp capacitor 1008.

The feedback circuit 1070 can include a resistor divider (shown as resistors 1272 and 1274) coupled between the high-side terminal 1086 and ground. The feedback voltage $V_{FB}$ can be determined by the output voltage $V_{OUT}$ and the resistances of the resistors 1272 and 1274. However, the invention is not so limited; other alternative methods can be used to generate a feedback signal indicative of the output voltage $V_{OUT}$.

As shown in FIG. 12, the CMP3 1203 can output a signal 1260 to the G1 1262 and the G2 1264 by comparing the feedback voltage $V_{FB}$ with the preset voltage $V_{PRE}$. The signal 1260 can be referred to as a "PULSE" signal. The G2 1264 can output a signal 1236 to control the switch 1232 coupled to the sub-resistor 1221. The signal 1236 can be referred to as an "accelerate" signal or an "ACCEL" signal. The switch 1232 can be referred to as an "accelerate" switch. In addition, the switch 1234 coupled between the resistor 1020 and the ramp capacitor 1008 can be referred to as a "delay" switch. By using the CMP3 1203, the G1 1262, the G2 1264, the accelerate switch 1232, the delay switch 1234, the SRFF 1248, and the SRFF 1258, the average voltage $V_{AVE}$ of the output voltage $V_{OUT}$ can be adjusted to a target voltage $V_{TARGET}$. More specifically, on one hand, if the average voltage $V_{AVE}$ is less than the target voltage $V_{TARGET}$, the CMP3 1203 outputs a logic-high PULSE signal 1260 to set the accelerate signal 1236 to logic high, e.g., via the G2 1264. The accelerate switch 1232, therefore, is turned on to increase the duty cycle of the PWM signal 1084 to increase the average voltage $V_{AVE}$. On the other hand, if the average voltage $V_{AVE}$ is greater than the target voltage $V_{TARGET}$, the CMP3 1203 outputs a logic-low PULSE signal 1260. The logic-low PULSE signal 1260 maintains the PWM signal 1084 logic low, e.g., via the G1 1262 and the SRFF 1248, and maintains the delay switch 1234 off, such that the duty cycle of the PWM signal 1084 is reduced to decrease the average voltage $V_{AVE}$. Operations of the adjustment process regarding the average voltage $V_{AVE}$ of the output voltage $V_{OUT}$ will be described in combination with FIG. 13.

Figure 13:
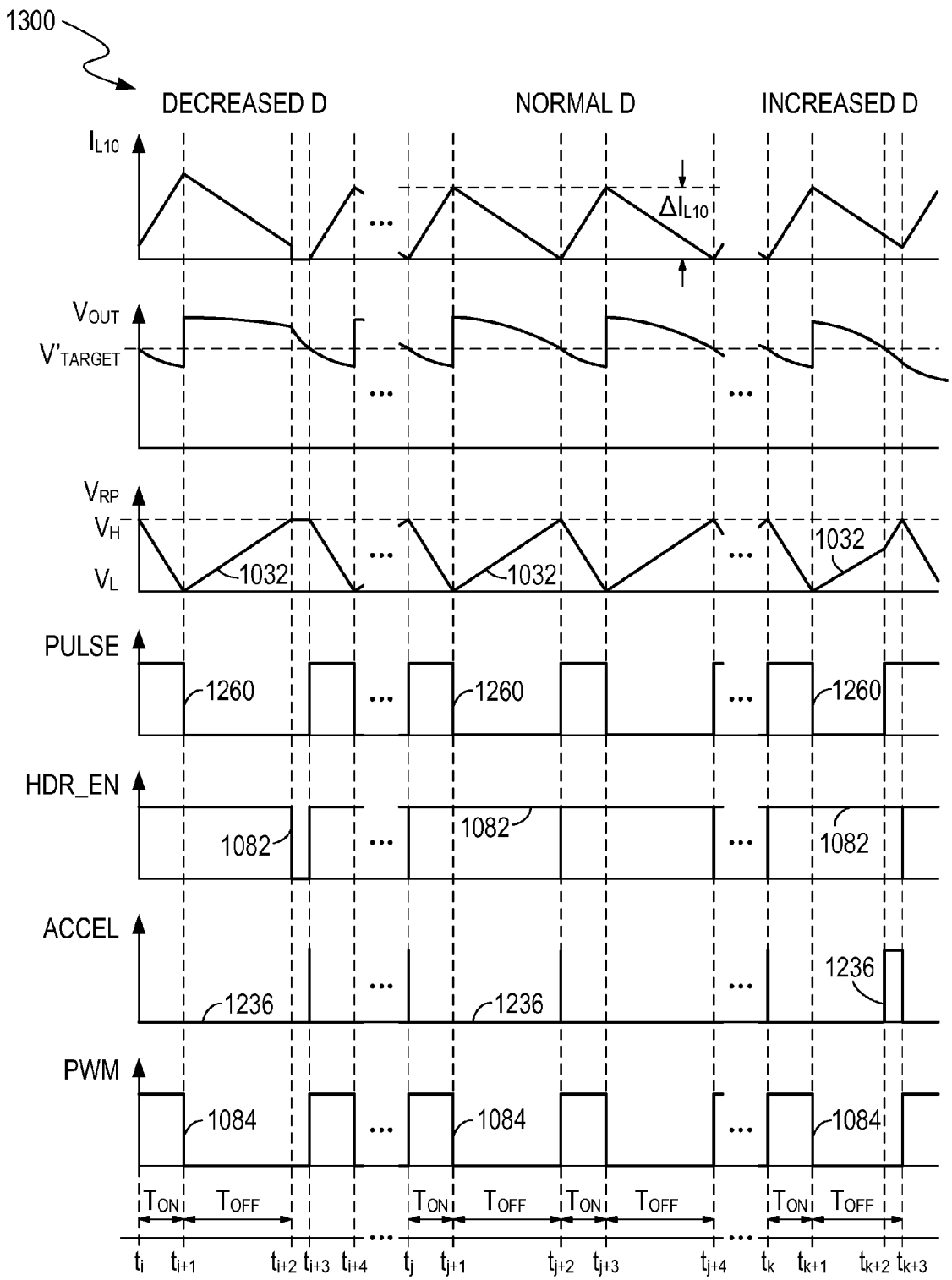
FIG. 13 illustrates a timing diagram of examples of signals associated with the DC to DC converter shown in FIG. 12.

FIG. 13 illustrates a timing diagram 1300 of examples of signals (e.g., the signals $I_{L10}$, $V_{OUT}$, 1032, 1260, 1082, 1236, and 1084) associated with the DC to DC converter 1000A shown in FIG. 12. In the example of FIG. 13, the operations of the controller 1002A may include different modes, e.g., a "decreased D mode", a "normal D mode", and an "increased D" mode. For example, the output voltage $V_{OUT}$ (shown in FIG. 13) may fluctuate with respect to a predetermined level $V'_{TARGET}$. In the normal D mode (e.g., from time $t_j$ to time $t_{j+4}$), the output voltage $V_{OUT}$ decreases to the predetermined level $V'_{TARGET}$ when the ramp signal 1032 increases to the reference voltage $V_H$ (e.g., at time $t_{j+2}$). The average voltage $V_{AVE}$ of the output voltage $V_{OUT}$ can be equal to the target voltage $V_{TARGET}$. In one embodiment, the target voltage $V_{TARGET}$ is approximately equal to the predetermined level $V'_{TARGET}$. In the decreased D mode (e.g., from time $t_i$ to time $L_{i+4}$), the output voltage $V_{OUT}$ is greater than the predetermined level $V'_{TARGET}$ when the ramp signal 1032 increases to the reference voltage $V_H$ (e.g., at time $L_{i+2}$). The average voltage $V_{AVE}$ is greater than the target voltage $V_{TARGET}$. Thus, the controller 1002A decreases the duty cycle of the PWM signal 1084 so as to decrease the average voltage $V_{AVE}$. In the increased D mode (e.g., from time $t_k$ to time $t_{k+3}$), the output voltage $V_{OUT}$ decreases to the predetermined level $V'_{TARGET}$ (e.g., at time $t_{k+2}$) before the ramp signal 1032 increases to the reference voltage $V_H$. The average voltage $V_{AVE}$ is less than the target voltage $V_{TARGET}$. Thus, the controller 1002A increases the duty cycle of the PWM signal 1084 so as to increase the average voltage $V_{AVE}$.

As shown in the example of FIG. 13, in the normal D mode (e.g., from time $t_j$ to time $t_{j+4}$), the accelerate signal 1236 is logic low, and the HDR_EN signal 1082 is logic high. The PULSE signal 1260 can be in phase with the PWM signal 1084. For example, the PULSE signal 1260 is logic high when the PWM signal 1084 is logic high, and is logic low when the PWM signal 1084 is logic low. The ramp signal 1032 and the current $I_{L10}$ can have saw-toothed waveforms. The ripple magnitude of the current $I_{L10}$ is constant since the ripple magnitude of the ramp signal 1032 is constant. The output voltage $V_{OUT}$ may fluctuate with respect to the predetermined level $V'_{TARGET}$, but the average voltage $V_{AVE}$ of the output voltage $V_{OUT}$ can be equal to the target voltage $V_{TARGET}$.

More specifically, during a TON_BOOST state (e.g., from time $t_j$ to time $t_{j+1}$) in the normal D mode, the current $I_{L10}$ increases as according to equation (23), and the ramp signal 1032 decreases according to equation (26). In addition, the output voltage $V_{OUT}$ decreases. In response to a rising edge of the PWM signal 1084 (e.g., at time $t_j$), the SRFF 1258 sets the HDR_EN signal 1082 to logic high. During the TON_BOOST state, since the ramp signal 1032 is less than the reference voltage $V_H$, the CMP2 1202 outputs a logic-low signal to the SRFF 1258, and the HDR_EN signal 1082 remains logic high. The delay switch 1234 coupled between the resistor 1020 and the ramp capacitor 1008 is on. In addition, the inverting output terminal QB of the SRFF 1248 is logic low, such that the accelerate signal 1236 is logic low and turns off the accelerate switch 1232. When the ramp signal 1032 decreases to the reference voltage $V_L$ (e.g., at time $t_{j+1}$), the CMP1 1201 outputs a logic-high signal to reset the SRFF 1248 to output a logic-low PWM signal 1084. At time $t_{j+1}$, the HDR_EN signal 1082 can still be logic high. Thus, the DC to DC converter 1000A enters a TOFF_BOOST state.

During a TOFF_BOOST state (e.g., from time $t_{j+1}$ to time $t_{j+2}$) in the normal D mode, the current $I_{L10}$ decreases according to equation (24), and the ramp signal 1032 increases as according to equation (28). In addition, the output voltage $V_{OUT}$ decreases. The output capacitor 1016 may have an equivalent series resistance (ESR). Thus, when the high-side switch 1010 is on and the low-side switch 1012 is off (e.g., at time $t_{j+1}$), the output voltage $V_{OUT}$ can increase to a level that is equal to the input voltage $V_{IN}$ plus a voltage across the inductor 1014 relatively fast. At time $t_{j+1}$, the output voltage $V_{OUT}$ is greater than the predetermined level $V'_{TARGET}$, e.g., the feedback voltage $V_{FB}$ is greater than the predetermined voltage $V_{PRE}$. Thus, the G2 1264 receives a logic-low PULSE signal 1260 from the CMP3 1203, and outputs a logic-low accelerate signal 1236 to keep the accelerate switch 1232 off. In addition, the HDR_EN signal 1082 is logic high and keeps the delay switch 1234 on.

In the normal D mode, when the ramp signal 1032 increases to the reference voltage $V_H$ (e.g., at time $t_{j+2}$), the output voltage $V_{OUT}$ decreases to the predetermined level $V'_{TARGET}$. The CMP2 1202 outputs a logic-high signal to the SRFF 1258 to set the non-inverting output terminal Q of the SRFF 1258 to logic high. In addition, the CMP3 1203 outputs a logic-high PULSE signal 1260. Thus, the G1 1262 outputs a logic-high signal to the SRFF 1248 to set the PWM signal 1084 to logic high. In one embodiment, there may be a time interval $\Delta T_1$ between the moment when the set terminal S of the SRFF 1258 receives a logic-high signal from the CMP2 1202 and the moment when the reset terminal R of the SRFF 1258 receives a logic-high PWM signal 1084. The time interval $\Delta T_1$ is relatively short. In other words, the HDR_EN signal 1082 can be logic low during the time interval $\Delta T_1$ (e.g., as shown at times $t_j$, $t_{j+2}$, $t_{j+4}$) and such status lasts for a relatively short time. Compared with the time durations $T_{ON}$ and $T_{OFF}$, the time interval $\Delta T_1$ can be omitted. In one embodiment, there may be a time duration $\Delta T_2$ when the G2 1264 receives a logic-high signal from the inverting output terminal QB of the SRFF 1248 and a logic-high PULSE signal 1260 from the CMP3 1203. The time duration $\Delta T_2$ is relatively short. In other words, the accelerate signal 1236 can be logic high during the time duration $\Delta T_2$ (e.g., as shown at times $t_j$, $t_{j+2}$, $t_{j+4}$) and such status lasts for a relatively short time. Compared with the time durations $T_{ON}$ and $T_{OFF}$, the time duration $\Delta T_2$ can be omitted.

In the decreased D mode (e.g., from time $t_i$ to time $t_{i+4}$), the accelerate signal 1236 is logic low, and the HDR_EN signal 1082 can be logic high or logic low. During a TON_BOOST state (e.g., from time $t_i$ to time $t_{i+1}$) in the decreased D mode, the status of the signals $I_{L10}$, $V_{OUT}$, 1032, 1260, 1082, 1236, and 1084 can be similar to those during a TON_BOOST state (e.g., from time $t_j$ to time $t_{j+1}$) in the normal D mode. However, during a TOFF_BOOST state (e.g., from time $t_{i+1}$ to time $t_{i+2}$) in the decreased D mode, the output voltage $V_{OUT}$ is greater than the predetermined level $V'_{TARGET}$ when the ramp signal 1032 increases to the reference voltage $V_H$ (e.g., at time $t_{i+2}$). As such, for example at time $t_{i+2}$, the PULSE signal 1260 is logic low, such that the G1 1262 outputs a logic-low signal to the SRFF 1248 to maintain the PWM signal 1084 logic low. Meanwhile, the CMP2 1202 outputs a logic-high signal to set the SRFF 1258 to output a logic-low HDR_EN signal 1082. Thus, the DC to DC converter 1000A enters a SKIP state (e.g., from time $t_{i+2}$ to time $t_{i+3}$).

During the SKIP state, the delay switch 1234 coupled between the resistor 1020 and the ramp capacitor 1008 is turned off by the HDR_EN signal 1082, so that the ramp signal 1032 remains unchanged. Furthermore, the output voltage $V_{OUT}$ continues to decrease because the output capacitor 1016 may discharge to a load (not shown in FIG. 12). When the output voltage $V_{OUT}$ decreases to the predetermined level $V'_{TARGET}$, e.g., at time $t_{i+3}$, the CMP3 1203 outputs a logic-high PULSE signal 1260 to the G1 1262. Since the non-inverting output terminal Q of the SRFF 1258 is also logic high, the G1 1262 outputs a logic-high signal to the SRFF 1248 to set the PWM signal 1084 to logic high. In response to the PWM signal 1084, the SRFF 1258 sets the HDR_EN signal 1082 to logic high, and turns on the delay switch 1234. In other words, at time $t_{i+3}$, the DC to DC converter 1000A enters a new TON_BOOST state. As a result, the duty cycle of the PWM signal 1084 can be decreased in the decreased D mode.

In the increased D mode (e.g., from time $t_k$ to time $t_{k+3}$), the accelerate signal 1236 can be logic high or logic low, and the HDR_EN signal 1082 is logic high. During a TON_BOOST state (e.g., from time $t_k$ to time $t_{k+1}$) in the increased D mode, the status of the signals $I_{L10}$, $V_{OUT}$, 1032, 1260, 1082, 1236, and 1084 can be similar to those during a TON_BOOST state (e.g., from time $t_j$ to time $t_{j+1}$) in the normal D mode. However, during a TOFF_BOOST state (e.g., from time $t_{k+1}$ to time $t_{k+2}$) in the increased D mode, the output voltage $V_{OUT}$ decreases to the predetermined level $V'_{TARGET}$ (e.g., at time $t_{k+2}$) before the ramp signal 1032 increases to the reference voltage $V_H$. As such, for example at time $t_{k+2}$, the PULSE signal 1260 is logic high. In addition, the inverting output terminal QB of the SRFF 1248 is logic high. Thus, the G2 1264 outputs a logic-high accelerate signal 1236 to turn on the accelerate switch 1232. The resistance $R_{RP}$ of the resistor 1020 decreases, e.g., from $R_{RP0}+R_{RP1}$ to $R_{RP0}$, and the control current $I_{C10}$ increases. Therefore, the time for the ramp signal 1032 to increase from the reference voltage $V_L$ to the reference voltage $V_H$ can be shortened. When the ramp signal 1032 increases to the reference voltage $V_H$ (e.g., at time $t_{k+3}$), the CMP2 1202 outputs a logic-high signal to set the PWM signal 1094 to logic high, e.g., via the SRFF 1258, the G1 1262, and the SRFF 1248. Accordingly, at time $t_{k+3}$, the DC to DC converter 1000A enters a new TON_BOOST state. As a result, the duty cycle of the PWM signal 1084 can be increased in the increased D mode.

In one embodiment, the operation modes, e.g., the decreased D mode, the normal D mode, and the increased D mode, of the controller 1002A are selected automatically based on the status of the output voltage $V_{OUT}$. Consequently, the average voltage $V_{AVE}$ of the output voltage $V_{OUT}$ can be adjusted to the target voltage $V_{TARGET}$. The magnitude of the fluctuation of the output voltage $V_{OUT}$ is relatively small and can be omitted. As such, the output voltage $V_{OUT}$ is approximately equal to the target voltage $V_{TARGET}$.

Figure 14:
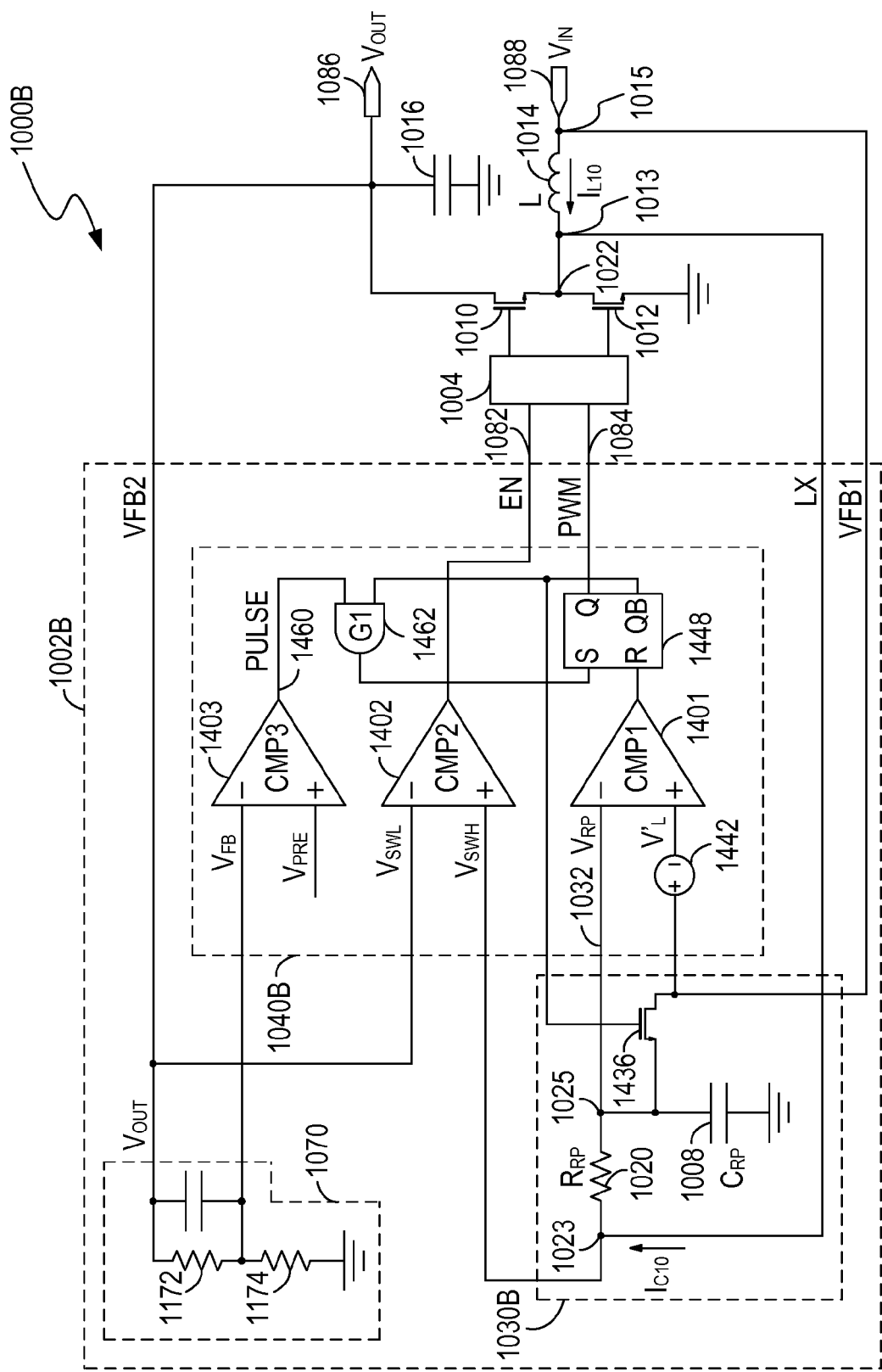
FIG. 14 illustrates a circuit diagram of an example of a DC to DC converter, in accordance with one embodiment of the present invention.

FIG. 14 illustrates a circuit diagram of an example of a DC to DC converter 1000B, in accordance with one embodiment of the present invention. Elements that are labeled the same as in FIG. 10A, FIG. 10B, and FIG. 12, have similar function. As shown in FIG. 14, a controller 1002B includes a ramp signal generator 1030B, a PWM signal generator 1040B, and a feedback circuit 1070.

The ramp signal generator 1030B can include the resistor 1020, the ramp capacitor 1008, and a switch 1436. The first end 1023 of the resistor 1020 is coupled to the first terminal 1013 of the inductor 1014, and the second end 1025 of the resistor 1020 is coupled the second terminal 1015 of the inductor 1014 via the switch 1436. The ramp capacitor 1008 is coupled between the second end 1025 of the resistor 1020 and ground.

The PWM signal generator 1040B can include an offset circuit 1442, a comparator 1401 (hereinafter CMP1 1401), a comparator 1402 (hereinafter CMP2 1402), a comparator 1403 (hereinafter CMP3 1403), an SRFF 1448, and a logic AND gate 1462 (hereinafter G1 1462). The CMP1 1401 includes a non-inverting input terminal coupled to the second terminal 1015 of the inductor 1014 via the offset circuit 1442, an inverting input terminal coupled to the second end 1025 of the resistor 1020, and an output terminal coupled to a reset terminal R of the SRFF 1448. The CMP2 1402 includes a non-inverting input terminal coupled to a first terminal of the high-side switch 1010, e.g., shown as the switching node 1022, an inverting input terminal coupled to a second terminal of the high-side switch 1010, e.g., shown as the high-side terminal 1086, and an output terminal coupled to the enable output terminal EN of the controller 1002B. The CMP3 1402 includes a non-inverting input terminal coupled to a voltage source (not shown in FIG. 14) that provides a preset voltage $V_{PRE}$, an inverting input terminal coupled to the feedback circuit 1070, and an output terminal coupled to the G1 1462. Input terminals of the G1 1462 are coupled to the CMP3 1403 and an inverting output terminal QB of the SRFF 1448, and an output terminal of the G1 1462 is coupled to a set terminal S of the SRFF 1448. The inverting output terminal QB of the SRFF 1448 is also coupled to a control terminal of the switch 1436. In addition, a non-inverting output terminal Q of the SRFF 1448 is coupled to the control output terminal PWM of the controller 1002B.

In one embodiment, the CMP1 1401 receives a reference voltage V'$_L$ from the offset circuit 1442 and outputs a signal to SRFF 1448 by comparing the ramp signal 1032 with reference voltage V'$_L$. The CMP1 1401 outputs a logic-high signal if the ramp signal 1032 is no greater than the reference voltage V'$_L$, and outputs a logic-low signal if the ramp signal 1032 is greater than the reference voltage V'$_L$. The CMP2 1402 receives a voltage V$_{SWH}$, e.g., V$_{SWH}$=V$_{1013}$, at the first terminal of the high-side switch 1010 and a voltage V$_{SWL}$, e.g., V$_{SWL}$=V$_{OUT}$, at the second terminal of the high-side switch 1010, and outputs a signal to the enable output terminal EN of the controller 1002B by comparing the voltages V$_{SWH}$ and V$_{SWL}$. The CMP2 1402 outputs a logic-high signal if the voltage V$_{SWH}$ is greater than the voltage V$_{SWL}$, and outputs a logic-low signal if the voltage V$_{SWH}$ is no greater than the voltage V$_{SWL}$. In addition, the SRFF 1448 can be trigged by a rising edge of an input signal of the SRFF 1448 in a similar manner as described in relation to FIG. 12.

In one embodiment, the controller 1002B controls a ripple magnitude of the ramp signal 1032 and a ripple magnitude of the current I$_{L10}$ to be constant by comparing the ramp signal 1032 with the reference voltage V'$_L$ and by comparing the voltages V$_{SWH}$ and V$_{SWL}$. More specifically, the PWM signal generator 1040B controls a status of the PWM signal 1084 according to the comparison between the ramp signal 1032 and the reference voltage V'$_L$, and controls a status of the HDR_EN signal 1082 according to the comparison between the voltages V$_{SWH}$ and V$_{SWL}$.

In one embodiment, when the PWM signal 1084 is logic high, the current I$_{L10}$ increases, and the ramp signal 1032 decreases. When the current I$_{L10}$ increases to a specific level, e.g., the ramp signal 1032 decreases to the reference voltage V'$_L$, the CMP1 1401 outputs a logic-high signal to reset the SRFF 1448. Therefore, the SRFF 1448 sets the PWM signal 1084 to logic low to decrease the current I$_{L10}$. Meanwhile, the inverting output terminal QB of the SRFF 1448 is logic high and turns on the switch 1436, and therefore the ramp signal 1032 is controlled to the voltage V$_{1015}$ at the second terminal 1015 of the inductor 1014. In one embodiment, the high-side switch 1010 has an on-resistance, such that the voltage V$_{SWH}$ is greater than the voltage V$_{SWL}$ if the current I$_{L10}$ is greater than a predetermined level, e.g., zero amperes. When the current I$_{L10}$ decreases the predetermined level, e.g., zero amperes, the voltage V$_{SWH}$ decreases to the voltage V$_{SWL}$, and therefore the CMP2 1402 sets the HDR_EN signal 1082 to logic low to turn off the high-side switch 1010. Thus, the current I$_{L10}$ is no greater than the predetermined level, e.g., zero amperes. In one embodiment, the CMP3 1403 can set the PWM signal 1084 to logic high again according to the output voltage V$_{OUT}$. As a result, the ramp signal 1032 can have a maximum level that is equal to the voltage V$_{1015}$ and a minimum level that is equal to the reference voltage V'$_L$. The current I$_{L10}$ can also have a maximum level and a minimum level, e.g., can be in a predetermined range based on the ramp signal 1032. The ripple magnitude of the ramp signal 1032 can be equal to a difference between the voltage V$_{1015}$ and the reference voltage V'$_L$. The difference V$_{1015}$−V'$_L$ can be constant, such that the ripple magnitude of the ramp signal 1032 can be constant. As a result, the ripple magnitude of the current I$_{L10}$ can also be constant.

In the example of FIG. 14, the switching circuit includes the high-side switch 1010 and the low-side switch 1012. However, in an alternative embodiment, the high-side switch 1010 can be replaced by a diode, and the CMP2 1402 can be omitted. Specifically, the diode includes a cathode coupled to the high-side terminal 1086 and an anode coupled to the switching node 1022. Thus, when the low-side switch 1012 is turned on, the diode is reverse biased. When the low-side switch 1012 is turned off and the current I$_{L10}$ is greater than zero amperes, the diode is forward biased. When the current I$_{L10}$ decreases to zero amperes, the diode is turned off.

In the example of FIG. 14, means/circuitry for controlling the voltage V$_{1025}$ at the second end 1025 of the resistor 1020 towards the voltage V$_{1015}$ at the second terminal 1015 of the inductor 1014 includes the offset circuit 1442, the CMP1 1401, the SRFF 1448, and the switch 1436. Specifically, the CMP1 1401 compares the voltage V$_{1025}$ with the reference voltage V'$_L$ to control the switch 1436 according to the comparison. When the voltage V$_{1025}$ decreases to the reference voltage V'$_L$, the switch 1436 is turned on so that the voltage V$_{1025}$ is controlled to the voltage V$_{1015}$. Thus, the voltage V$_{1025}$ can be ranged from V'$_L$ to V$_{1015}$. A preset voltage across the offset circuit 1442 is V$_{S3}$, and the reference voltage V'$_L$ provided to the CMP1 1401 is equal to the voltage V$_{1015}$ minus the preset voltage V$_{S3}$, e.g., V'$_L$=V$_{1015}$−V$_{S3}$. In one embodiment, the preset voltage V$_{S3}$ across the offset circuit 1442 is substantially constant. In addition, compared with the voltage V$_{1015}$, the preset voltages V$_{S3}$ is relatively small and can be omitted, such that the voltage V$_{1025}$ that is ranged from V'$_L$ to V$_{1015}$ can be considered to be approximately equal to the voltage V$_{1015}$.

In the example of FIG. 14, the CMP1 1401 controls the ramp signal 1032 to have a constant ripple magnitude and also control the voltage V$_{1025}$ towards the voltage V$_{1015}$. However, in another embodiment, the ramp signal 1032 and the voltage V$_{1025}$ can be controlled by different comparators. In one such embodiment, the range of the ramp signal 1032 can be the same as or different from the range of the voltage V$_{1025}$. In one such embodiment, a current-controlled current source, e.g., the circuit 324 in FIG. 3, can be used to generate a control current equal to the current through the resistor 1020 to control the ramp capacitor 1008.

In one embodiment, by using the CMP3 1403, the G1 1462, and the SRFF 1448, the average voltage V$_{AVE}$ of the output voltage V$_{OUT}$ can be adjusted to a target voltage V$_{TARGET}$. Operations of the adjustment process regarding the average voltage V$_{AVE}$ of the output voltage V$_{OUT}$ will be described in combination with FIG. 15.

Figure 15:
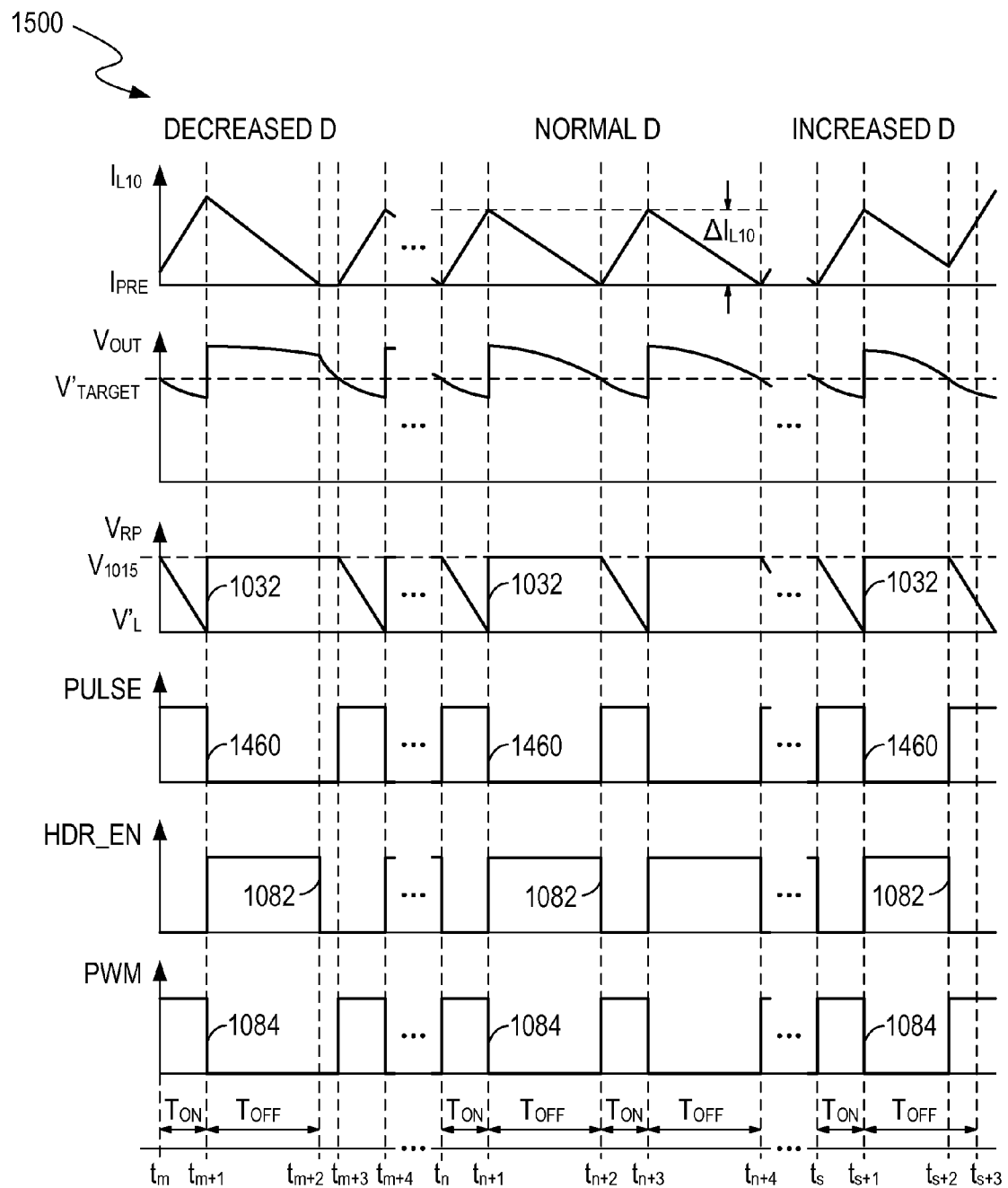
FIG. 15 illustrates a timing diagram of examples of signals associated with the DC to DC converter shown in FIG. 14.

FIG. 15 illustrates a timing diagram 1500 of examples of signals (e.g., the signals I$_{L10}$, V$_{OUT}$, 1032, 1460, 1082, and 1084) associated with the DC to DC converter 1000B shown in FIG. 14. As shown in FIG. 15, the operations of the controller 1002B may include different modes, e.g., a "decreased D mode", a "normal D mode", and a "increased D" mode. In the normal D mode (e.g., from time t$_n$ to time t$_{n+4}$), the output voltage V$_{OUT}$ decreases to the predetermined level V'$_{TARGET}$ when the current I$_{L10}$ decreases to a predetermined level I$_{PRE}$ (e.g., at time t$_{n+2}$). The average voltage V$_{AVE}$ of the output voltage V$_{OUT}$ can be equal to the target voltage V$_{TARGET}$. In one embodiment, the predetermined level I$_{PRE}$ is zero amperes. In the decreased D mode (e.g., from time t$_m$ to time t$_{m+4}$), the output voltage V$_{OUT}$ is greater than the predetermined level V'$_{TARGET}$ when the current I$_{L10}$ decreases to the predetermined level I$_{PRE}$ (e.g., at time t$_{m+2}$). The average voltage V$_{AVE}$ is greater than the target voltage V$_{TARGET}$. Thus, the controller 1002B decreases the duty cycle of the PWM signal 1084 so as to decrease the average voltage V$_{AVE}$. In the increased D mode (e.g., from time t$_s$ to time t$_{s+3}$), the output voltage V$_{OUT}$ decreases to the predetermined level V$_{TARGET}$ (e.g., at time t$_{s+2}$) before the current I$_{L10}$ decreases to the predetermined level I$_{PRE}$. The average voltage V$_{AVE}$ is less than the target voltage $V_{TARGET}$. Thus, the controller 1002B increases the duty cycle of the PWM signal 1084 so as to increase the average voltage $V_{AVE}$.

As shown in the example of FIG. 15, in the normal D mode, the HDR_EN signal 1082 is in anti-phase with the PWM signal 1084. For example, the HDR_EN signal 1082 is logic low when the PWM signal 1084 is logic high, and is logic high when the PWM signal 1084 is logic low. The PULSE signal 1460 is in phase with the PWM signal 1084. For example, the PULSE signal 1460 is logic high when the PWM signal 1084 is logic high, and is logic low when the PWM signal 1084 is logic low. The ramp signal 1032 decreases during a TON_BOOST state (e.g., from time $t_n$ to time $t_{n+1}$) and is equal to the voltage $V_{1015}$ during a TOFF_BOOST state (e.g., from time $t_{n+1}$ to time $t_{n+2}$). The current $I_{L10}$ has a saw-toothed waveform. The ripple magnitude of the current $I_{L10}$ is constant since the ripple magnitude of the ramp signal 1032 is constant. The output voltage $V_{OUT}$ may fluctuate with respect to the predetermined level $V'_{TARGET}$, but the average voltage $V_{AVE}$ of the output voltage $V_{OUT}$ is equal to the target voltage $V_{TARGET}$. As mentioned above, the predetermined level $V'_{TARGET}$ can be approximately equal to the target voltage $V_{TARGET}$.

More specifically, during a TON_BOOST state (e.g., from time $t_n$ to time $t_{n+1}$) in the normal D mode, the current $I_{L10}$ increases according to equation (23), the ramp signal 1032 decreases as according to equation (26), and the output voltage $V_{OUT}$ decreases. The PWM signal 1084 is logic high. Since the high-side switch 1010 is off and the low-side switch 1012 is on, the switching node 1022 is grounded. Thus, the voltage $V_{SWH}$ at the first terminal of the high-side switch 1010 is less than the voltage $V_{SWL}$ at the second terminal of the high-side switch 1010, and the CMP2 1402 sets the HDR_EN signal 1082 to logic low. Furthermore, the output voltage $V_{OUT}$ is less than the predetermined level $V'_{TARGET}$, e.g., the feedback voltage $V_{FB}$ is less than the predetermined voltage $V_{PRE}$, and therefore the CMP3 1403 sets the PULSE signal 1460 to logic high.

When the ramp signal 1032 decreases to the reference voltage $V'_L$ (e.g., at time $t_{n+1}$), the CMP1 1401 outputs a logic-high signal to reset the SRFF 1448 to output a logic-low PWM signal 1084. Therefore, the low-side switch 1012 is turned off. In addition, the inverting output terminal QB of the SRFF 1448 is set to logic high to turn on the switch 1436. At time $t_{n+1}$, a current loop that includes the inductor 1014, the resistor 1020, and the switch 1436 is formed. The inductor 1014 releases energy, e.g., by transforming magnetic field energy into electric energy, through the current loop, and therefore the voltage $V_{1013}$ is greater than the voltage $V_{1015}$. In one such embodiment, the voltage $V_{SWH}$ (e.g., $V_{SWH}=V_{1013}$) at time $t_{n+1}$ can be greater than the voltage $V_{SWL}$ (e.g., $V_{SWL}=V_{OUT}$), such that the CMP2 1402 sets the HDR_EN signal 1082 to logic high to turn on the high-side switch 1010. Accordingly, the DC to DC converter 1000B enters a TOFF_BOOST state.

During the TOFF_BOOST state (e.g., from time $t_{n+1}$ to time $t_{n+2}$), the high-side switch 1010 is on, and the output voltage $V_{OUT}$ is greater than the predetermined level $V'_{TARGET}$. Therefore, the CMP3 1403 outputs a logic-low PULSE signal 1460. The current $I_{L10}$ flows to the high-side terminal 1086 via the high-side switch 1010. As the current $I_{L10}$ decreases, a voltage, e.g., $V_{SWH}-V_{SWL}$, across the high-side switch 1010 decreases. When the current $I_{L10}$ decreases to zero amperes, the voltage $V_{SWH}$ decreases to the voltage $V_{SWL}$. Therefore, as shown at time $t_{n+2}$, the CMP2 1402 sets the HDR_EN signal 1082 to logic low to turn the high-side switch 1010 off. In addition, in the normal D mode, the output voltage $V_{OUT}$ decreases to the predetermined level $V'_{TARGET}$ when the current $I_{L10}$ decreases to zero amperes. Thus, at time $t_{n+2}$, the CMP3 1403 outputs a logic-high PULSE signal 1460 to set the PWM signal 1084 to logic high, e.g., via the G1 1462 and the SRFF 1448. Accordingly, the DC to DC converter 1000B can enter a new TON_BOOST state at time $t_{n+2}$.

During a TON_BOOST state (e.g., from time $t_m$ to time $t_{m+1}$) in the decreased D mode, the status of the signals $I_{L10}$, $V_{OUT}$, 1032, 1460, 1082, and 1084 can be similar to those during a TON_BOOST state (e.g., from time $t_n$ to time $t_{n+1}$) in the normal D mode. However, during a TOFF_BOOST state (e.g., from time $t_{m+1}$ to time $t_{m+2}$) in the decreased D mode, the output voltage $V_{OUT}$ is greater than the predetermined level $V'_{TARGET}$ when the current $I_{L10}$ decreases to the predetermined level $I_{PRE}$, e.g., zero amperes. As such, for example from time $t_{m+2}$ to time $t_{m+3}$, the CMP3 1403 outputs a logic-low PULSE signal 1460 to maintain the PWM signal 1084 logic low, e.g., via the G1 1462 and the SRFF 1448. Meanwhile, the HDR_EN signal 1082 is logic low. Thus, the DC to DC converter 1000B enters a SKIP state (e.g., from time $t_{m+2}$ to time $t_{m+3}$).

During the SKIP state, the current $I_{L10}$ can be zero amperes, the ramp signal 1032 can remain at the voltage $V_{1015}$, and the output voltage $V_{OUT}$ decreases. When the output voltage $V_{OUT}$ decreases to the predetermined level $V'_{TARGET}$ (e.g., at time $t_{m+3}$), the CMP3 1403 outputs a logic-high PULSE signal 1460 to set the PWM signal 1084 to logic high, e.g., via the G1 1462 and the SRFF 1448. As such, the DC to DC converter 1000B enters a new TON_BOOST state at time $t_{m+3}$. As a result, the duty cycle of the PWM signal 1084 can be decreased in the decreased D mode.

During a TON_BOOST state (e.g., from time $t_s$ to time $t_{s+1}$) in the increased D mode, the status of the signals $I_{L10}$, $V_{OUT}$, 1032, 1460, 1082, and 1084 can be similar to those during a TON_BOOST state (e.g., from time $t_n$ to time $t_{n+1}$) in the normal D mode. However, during a TOFF_BOOST state (e.g., from time $t_{s+1}$ to time $t_{s+2}$) in the increased D mode, the output voltage $V_{OUT}$ decreases to the predetermined level $V'_{TARGET}$ (e.g., at time $t_{s+2}$) before the current $I_{L10}$ decreases to the predetermined level $I_{PRE}$, e.g., zero amperes. As such, for example at time $t_{s+2}$, the CMP3 1403 outputs a logic-high PULSE signal 1460 to set the PWM signal 1084 to logic high. In other words, the DC to DC converter 1000B can enter a new TON_BOOST state before the current $I_{L10}$ decreases to the predetermined level $I_{PRE}$. As a result, the duty cycle of the PWM signal 1084 can be increased in the increased D mode.

In one embodiment, the operation modes, e.g., the decreased D mode, the normal D mode, and the increased D mode, of the controller 1002B are selected automatically based on the status of the output voltage $V_{OUT}$. Consequently, the output voltage $V_{OUT}$ can be adjusted to the target voltage $V_{TARGET}$.

Figure 16:
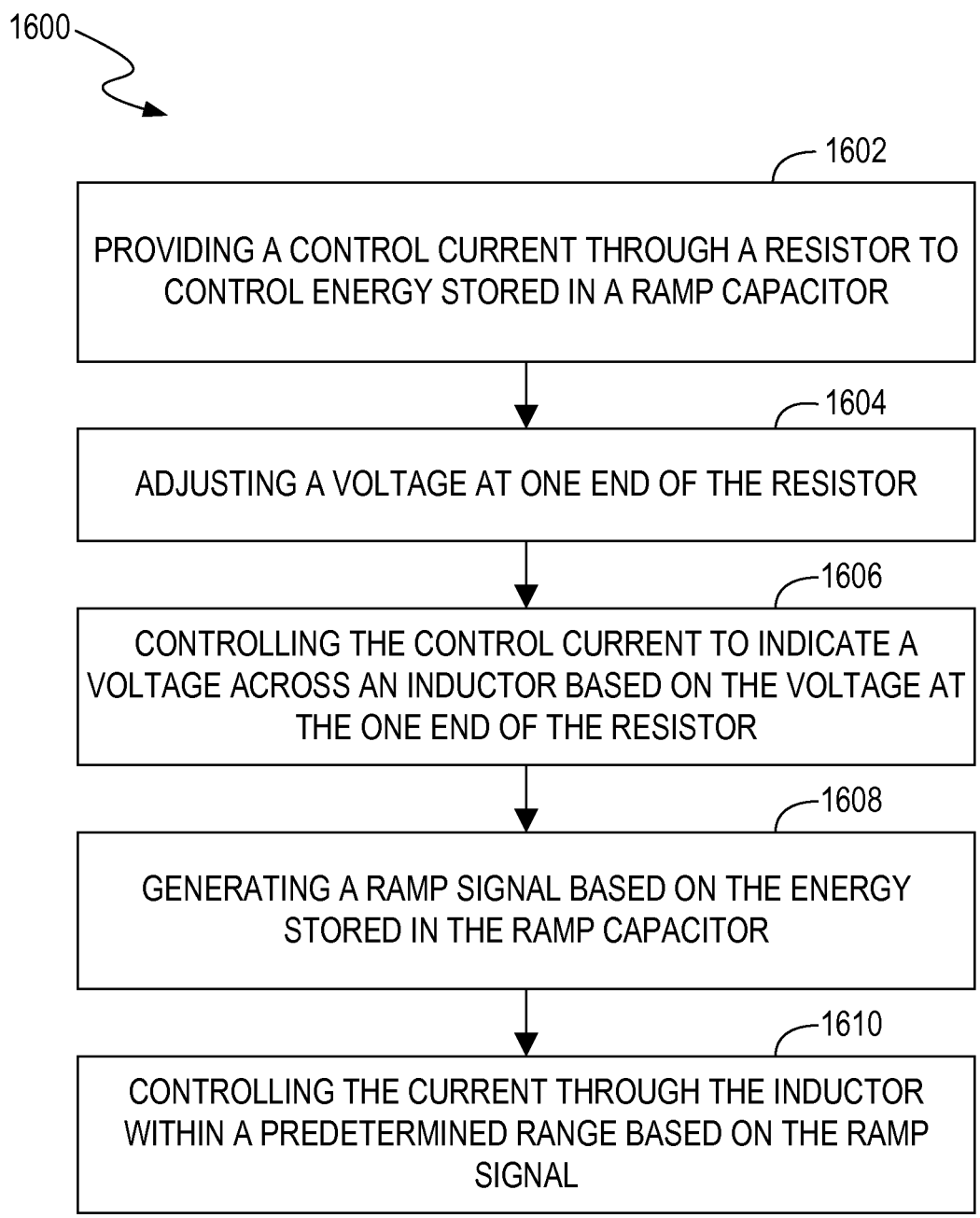
FIG. 16 illustrates a flowchart of examples of operations preformed by a controller in a DC to DC converter, in accordance with one embodiment of the present invention.

FIG. 16 illustrates a flowchart 1600 of examples of operations preformed by a controller in a DC to DC converter, in accordance with one embodiment of the present invention. FIG. 16 is described in combination with FIG. 10A, FIG. 10B, FIG. 12, and FIG. 14.

In block 1602, the controller 1002, 1002A, or 1002B provides the control current $I_{C10}$ through the resistor 1020 to control electric energy stored in the ramp capacitor 1008. In block 1604, the controller 1002, 1002A, or 1002B adjusts the voltage $V_{1025}$ at the second end 1025 of the resistor 1020 towards a voltage $V_{1015}$ at the second terminal 1015 of the inductor 1014.

In block 1606, the controller 1002, 1002A, or 1002B controls the control current $I_{C10}$ to indicate, e.g., be linearly proportional to, the voltage across the inductor 1014 based on the voltage $V_{1025}$ at the second end 1025 of the resistor 1020. In block 1608, the controller 1002, 1002A, or 1002B generates the ramp signal 1032 based on the electric energy stored in the ramp capacitor 1008. In block 1610, the controller 1002, 1002A, or 1002B controls the current $I_{L10}$ through the inductor 1014 within a predetermined range based on the ramp signal 1032. In one embodiment, the controller 1002, 1002A, or 1002B controls a ripple magnitude of the current $I_{L10}$ to be constant by controlling a ripple magnitude of the ramp signal 1032 to be constant.

Accordingly, embodiments according to the present invention provide DC to DC converters, e.g., buck converters, boost converters, etc., with CRC controllers. The CRC controllers can adjust output voltages of the DC to DC converters to target levels. In addition, the CRC controllers can control output currents of the DC to DC converters to have constant ripple magnitudes by using components or circuitry such as resistive components, inductive components, capacitive components, comparators, etc. Thus, the output voltages and currents of the DC to DC converters are more stable. The DC to DC converter can be used in various applications, e.g., power supply systems for integrated circuits, light emitting diodes, display system, etc.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A controller comprising:
    a ramp signal generator operable for providing a control current through a resistive component to control charging of and discharging of a capacitive component, said capacitive component operable for generating a ramp signal based on said charging and said discharging; and
    control circuitry coupled to said ramp signal generator and operable for controlling a voltage across said resistive component to indicate a voltage across an inductive component thereby controlling said control current to indicate said voltage across said inductive component, and operable for controlling a current through said inductive component into a first predetermined range by controlling said ramp signal of said capacitive component into a second predetermined range,
    wherein said ramp signal generator charges said capacitive component if said current through said inductive component varies from a first level to a second level, and discharges said capacitive component if said current through said inductive component varies from said second level to said first level, and wherein a ripple magnitude of said current through said inductive component is determined by a difference between said first and second levels.

2. The controller as claimed in claim 1, wherein a first end of said resistive component is electrically connected to a first terminal of said inductive component, and wherein said control circuitry controls an end voltage at a second end of said resistive component towards a terminal voltage at a second terminal of said inductive component.

3. The controller as claimed in claim 1, wherein said control circuitry comprises:
    comparator circuitry operable for comparing an end voltage at an end of said resistive component with a first reference voltage and a second reference voltage, and controlling said end voltage of said resistive component into a range between said first and second reference voltages according to the comparison,
    wherein said first reference voltage is equal to a terminal voltage at a terminal of said inductive component plus a first preset voltage, and said second reference voltage is equal to said terminal voltage of said inductive component minus a second preset voltage.

4. The controller as claimed in claim 1, wherein said control circuitry comprises:
    a comparator operable for comparing an end voltage at an end of said resistive component with a reference voltage to control a switch coupled between said end of said resistive component and a terminal of said inductive component, and controlling said end voltage of said resistive component into a range between said reference voltage and said terminal voltage of said inductive component according to the comparison,
    wherein said reference voltage is equal to said terminal voltage of said inductive component minus a preset voltage.

5. The controller as claimed in claim 1, wherein said control circuitry controls said control current to be linearly proportional to said voltage across said inductive component.

6. The controller as claimed in claim 1, wherein said control circuitry comprises a pulse-width modulation (PWM) signal generator operable for generating a PWM signal to control conduction of a high-side path and a low-side path according to said ramp signal from said capacitive component, and wherein said inductive component is coupled to a switching node between said high-side and low-side paths.

7. The controller as claimed in claim 6, wherein said control circuitry compares said ramp signal with a reference voltage to control said PWM signal thereby controlling said current through said inductive component into said first predetermined range.

8. The controller as claimed in claim 1, wherein said control circuitry controls said ripple magnitude of said current through said inductive component to be constant by controlling a ripple magnitude of said ramp signal to be constant.

9. A method for controlling a current through an inductive component, said method comprising:
    providing a control current through a resistive component to control charging of and discharging of a capacitive component;
    controlling said control current to indicate a voltage across said inductive component by controlling a voltage across said resistive component to indicate said voltage across said inductive component;
    generating a ramp signal, at said capacitive component, based on said charging and said discharging;
    controlling said current through said inductive component into a predetermined range by controlling said ramp signal into a second predetermined range;
    charging said capacitive component if said current through said inductive component varies from a first level to a second level; and discharging said capacitive component if said current through said inductive component varies from said second level to said first level,
wherein a ripple magnitude of said current through said inductive component is determined by a difference between said first and second levels.

10. The method as claimed in claim 9, wherein said controlling said voltage across said resistive component comprises:
controlling an end voltage at a first end of said resistive component towards a terminal voltage at a first terminal of said inductive component, wherein a second end of said resistive component is electrically connected to a second terminal of said inductive component.

11. The method as claimed in claim 9, wherein said controlling said control current to indicate said voltage across said inductive component comprises:
controlling said control current to be linearly proportional to said voltage across said inductive component.

12. The method as claimed in claim 9, wherein said controlling said current through said inductive component into said first predetermined range comprises:
controlling said ripple magnitude of said current through said inductive component to be constant by controlling a ripple magnitude of said ramp signal to be constant.

13. A DC to DC converter comprising:
an inductive component for providing an output voltage of said DC to DC converter;
a pair of switches coupled to said inductive component; and
a controller coupled to said inductive component and said pair of switches, and operable for providing a control current through a resistive component to control charging of and discharging of a capacitive component, operable for generating a ramp signal at said capacitive component based on said charging and said discharging, operable for controlling said control current to indicate a voltage across said inductive component by controlling a voltage across said resistive component to indicate said voltage across said inductive component, operable for controlling said pair of switches based on said ramp signal so as to control said output voltage and a current through said inductive component, and operable for controlling said current through said inductive component into a first predetermined range by controlling said ramp signal into a second predetermined range, wherein said controller charges said capacitive component if said current through said inductive component varies from a first level to a second level, and discharges said capacitive component if said current through said inductive component varies from said second level to said first level, and wherein a ripple magnitude of said current through said inductive component is determined by a difference between said first and second levels.

14. The DC to DC converter as claimed in claim 13, wherein a first end of said resistive component is electrically connected to a first terminal of said inductive component, and wherein said controller controls an end voltage at a second end of said resistive component towards a terminal voltage at a second terminal of said inductive component.

15. The DC to DC converter as claimed in claim 13, wherein said controller controls said control current to be linearly proportional to said voltage across said inductive component.

16. The DC to DC converter as claimed in claim 13, wherein said controller comprises a pulse-width modulation (PWM) signal generator coupled to said pair of switches and operable for generating a PWM signal to control said pair of switches.

17. The DC to DC converter as claimed in claim 16, wherein said controller comprises a comparator operable for comparing said ramp signal with a reference voltage to control said PWM signal so as to control said ripple magnitude of said current through said inductive component.

18. The DC to DC converter as claimed in claim 16, wherein said controller comprises a comparator operable for comparing a feedback signal indicative of said output voltage with a reference voltage to control said PWM signal so as to control said output voltage.

19. The DC to DC converter as claimed in claim 13, wherein said controller controls said ripple magnitude of said current through said inductive component to be constant by controlling a ripple magnitude of said ramp signal to be constant.

20. The controller as claimed in claim 2, wherein said control circuitry comprises an operational amplifier having a first input terminal that receives a signal representative of said terminal voltage of said inductive component and having a second input terminal that is electrically connected to said second end of said resistive component.

21. The controller as claimed in claim 1, wherein said control circuitry comprises comparator circuitry operable for comparing said ramp signal with a first reference voltage and with a second reference voltage to control said ramp signal into said second predetermined range, and wherein said second predetermined range is between said first and second reference voltages.

22. The controller as claimed in claim 1, wherein said control circuitry comprises comparator circuitry operable for comparing said ramp signal with a reference voltage to control a switch coupled between said capacitive component and a terminal of said inductive component to control said ramp signal into said second predetermined range, and wherein said second predetermined range is between said reference voltage and a terminal voltage at said terminal of said inductive component.

23. A controller comprising:
a ramp signal generator operable for providing a control current through a resistive component to control charging of and discharging of a capacitive component, said capacitive component operable for generating a ramp signal based on said charging and said discharging; and
control circuitry coupled to said ramp signal generator and operable for controlling a voltage across said resistive component to indicate a voltage across an inductive component thereby controlling said control current to indicate said voltage across said inductive component, and operable for controlling a current through said inductive component into a first predetermined range by controlling said ramp signal of said capacitive component into a second predetermined range, wherein said control circuitry comprises:
comparator circuitry operable for comparing an end voltage at an end of said resistive component with a first reference voltage and a second reference voltage, and controlling said end voltage of said resistive component into a range between said first and second reference voltages according to the comparison, wherein said first reference voltage is equal to a terminal voltage at a terminal of said inductive component plus a first preset voltage, and said second reference voltage is equal to said terminal voltage of said inductive component minus a second preset voltage.

24. A controller comprising:
a ramp signal generator operable for providing a control current through a resistive component to control charging of and discharging of a capacitive component, said capacitive component operable for generating a ramp signal based on said charging and said discharging; and
control circuitry coupled to said ramp signal generator and operable for controlling a voltage across said resistive component to indicate a voltage across an inductive component thereby controlling said control current to indicate said voltage across said inductive component, and operable for controlling a current through said inductive component into a first predetermined range by controlling said ramp signal of said capacitive component into a second predetermined range, wherein said control circuitry comprises:
a comparator operable for comparing an end voltage at an end of said resistive component with a reference voltage to control a switch coupled between said end of said resistive component and a terminal of said inductive component, and controlling said end voltage of said resistive component into a range between said reference voltage and said terminal voltage of said inductive component according to the comparison, wherein said reference voltage is equal to said terminal voltage of said inductive component minus a preset voltage.

25. A controller comprising:
a ramp signal generator operable for providing a control current through a resistive component to control charging of and discharging of a capacitive component, said capacitive component operable for generating a ramp signal based on said charging and said discharging; and
control circuitry coupled to said ramp signal generator and operable for controlling a voltage across said resistive component to indicate a voltage across an inductive component thereby controlling said control current to indicate said voltage across said inductive component, and operable for controlling a current through said inductive component into a first predetermined range by controlling said ramp signal of said capacitive component into a second predetermined range,
wherein a first end of said resistive component is electrically connected to a first terminal of said inductive component, wherein said control circuitry comprises an operational amplifier operable for controlling an end voltage at a second end of said resistive component towards a terminal voltage at a second terminal of said inductive component, and wherein said operational amplifier comprises a first input terminal that receives a signal representative of said terminal voltage of said inductive component, and a second input terminal that is electrically connected to said second end of said resistive component.

* * * * *